United States Patent
Utsunomiya

(10) Patent No.: US 8,928,951 B2
(45) Date of Patent: Jan. 6, 2015

(54) IMAGE PROCESSING APPARATUS, IMAGE PROCESSING METHOD, AND STORAGE MEDIUM

(71) Applicant: Canon Kabushiki Kaisha, Tokyo (JP)

(72) Inventor: Takehito Utsunomiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/913,142

(22) Filed: Jun. 7, 2013

(65) Prior Publication Data

US 2013/0335788 A1    Dec. 19, 2013

(30) Foreign Application Priority Data

Jun. 14, 2012 (JP) ................. 2012-134837

(51) Int. Cl.
*H04N 1/04* (2006.01)
*H04N 1/00* (2006.01)
*H04N 1/407* (2006.01)

(52) U.S. Cl.
CPC ....... *H04N 1/00801* (2013.01); *H04N 1/00572* (2013.01); *H04N 1/4076* (2013.01); *H04N 2201/044* (2013.01)
USPC ............................ 358/461; 358/496; 358/498

(58) Field of Classification Search
CPC ............... H04N 1/401; H04N 1/4076; H04N 2201/0424; H04N 1/193; H04N 2201/00042; H04N 1/02815; H04N 1/40056; H04N 2201/02868; H04N 1/1013; H04N 3/1581; H04N 27/14665; H04N 1/031; H04N 2201/03138; H04N 1/484; H04N 1/12; H04N 9/045; H04N 1/00002
USPC ......... 358/461, 475, 482, 483, 486, 488, 474, 358/509, 512–514, 505, 496, 498; 382/274, 382/313, 318, 319; 250/208.1, 216, 239, 250/234–236; 399/211, 212, 220, 221
See application file for complete search history.

(56) References Cited

U.S. PATENT DOCUMENTS

| | | | | |
|---|---|---|---|---|
| 4,967,233 A * | 10/1990 | Buchar et al. | ................. | 358/496 |
| 5,280,368 A * | 1/1994 | Fullerton | ....................... | 358/474 |
| 6,744,540 B1 * | 6/2004 | Masuda et al. | ............... | 358/488 |
| 6,989,915 B2 * | 1/2006 | Honjo et al. | .................. | 358/461 |
| 7,164,507 B2 * | 1/2007 | Beck et al. | .................... | 358/474 |
| 7,391,540 B2 * | 6/2008 | Chen | ............................. | 358/474 |
| 7,433,097 B2 * | 10/2008 | Spears | .......................... | 358/504 |
| 7,466,457 B2 * | 12/2008 | Chen | ............................. | 358/461 |
| 7,525,692 B2 * | 4/2009 | Nakaya | ......................... | 358/461 |
| 7,589,871 B2 * | 9/2009 | Yoshimoto et al. | ........... | 358/496 |
| 8,164,804 B2 * | 4/2012 | Tanaka et al. | ................ | 358/474 |
| 2013/0335754 A1 * | 12/2013 | Utsunomiya | ................. | 358/1.5 |

FOREIGN PATENT DOCUMENTS

JP     2002-290686 A    10/2002

* cited by examiner

*Primary Examiner* — Cheukfan Lee
(74) *Attorney, Agent, or Firm* — Canon U.S.A., Inc. IP Division

(57) ABSTRACT

An image processing apparatus includes an acquisition unit configured to acquire luminance information of a white reference member by reading the white reference member with an image reading unit including a sensor while rotating the image reading unit in units of a predetermined angle, and a correction unit configured to correct the luminance information acquired by the acquisition unit using a correction coefficient predetermined for each rotation angle of the image reading unit.

9 Claims, 32 Drawing Sheets

FIG. 12F
FIG. 12G
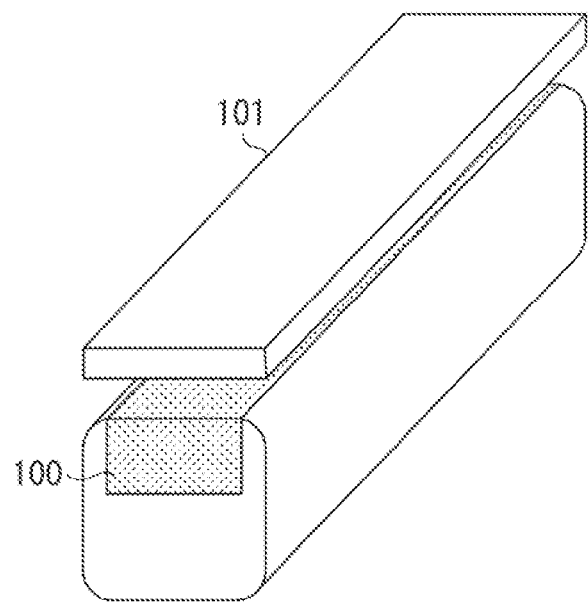
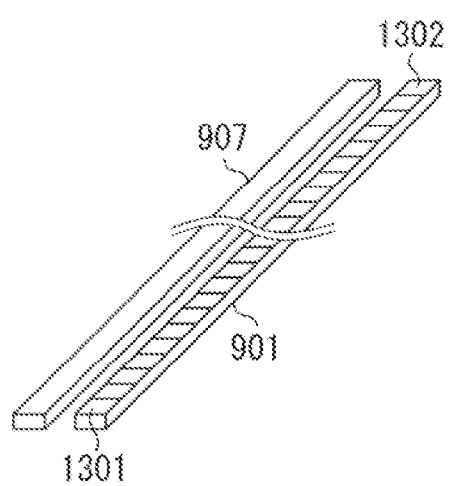

FIG. 13

| ROTATION ANGLE θ | RECEIVED LIGHT AMOUNT ~2510 |
|---|---|
| −50 | 10 |
| −49 | 10 |
| −48 | 10 ~2501 |
| −47 | 114 ~2502 |
| −46 | 116 |
| −45 | 118 |
| −44 | 120 |
| −43 | 122 |
| −42 | 125 |
| −41 | 127 |
| −5 | 212 |
| −4 | 216 |
| −3 | 219 |
| −2 | 221 |
| −1 | 219 |
| 0 | 216 |
| +1 | 212 |
| +2 | 210 |
| +3 | 208 |
| +4 | 204 |
| +5 | 202 |
| +41 | 127 |
| +42 | 123 |
| +43 | 120 ~2503 |
| +44 | 10 ~2504 |
| +45 | 10 |
| +46 | 10 |
| +47 | 10 |
| +48 | 10 |
| +49 | 10 |
| +50 | 10 |

FIG. 14B

| ROTATION ANGLE θ | RECEIVED LIGHT AMOUNT | |
|---|---|---|
| −15 DEGREES | 175 | |
| −14 DEGREES | 177 | |
| −13 DEGREES | 180 | |
| −2 DEGREES | 210 | ~1403 |
| −1 DEGREES | 208 | |
| 0 DEGREES | 205 | |
| +1 DEGREE | 201 | |
| +2 DEGREES | 199 | |
| +3 DEGREES | 197 | |
| +13 DEGREES | 170 | |
| +14 DEGREES | 167 | |
| +15 DEGREES | 166 | |

1404 (left label for −2 DEGREES row)

1411

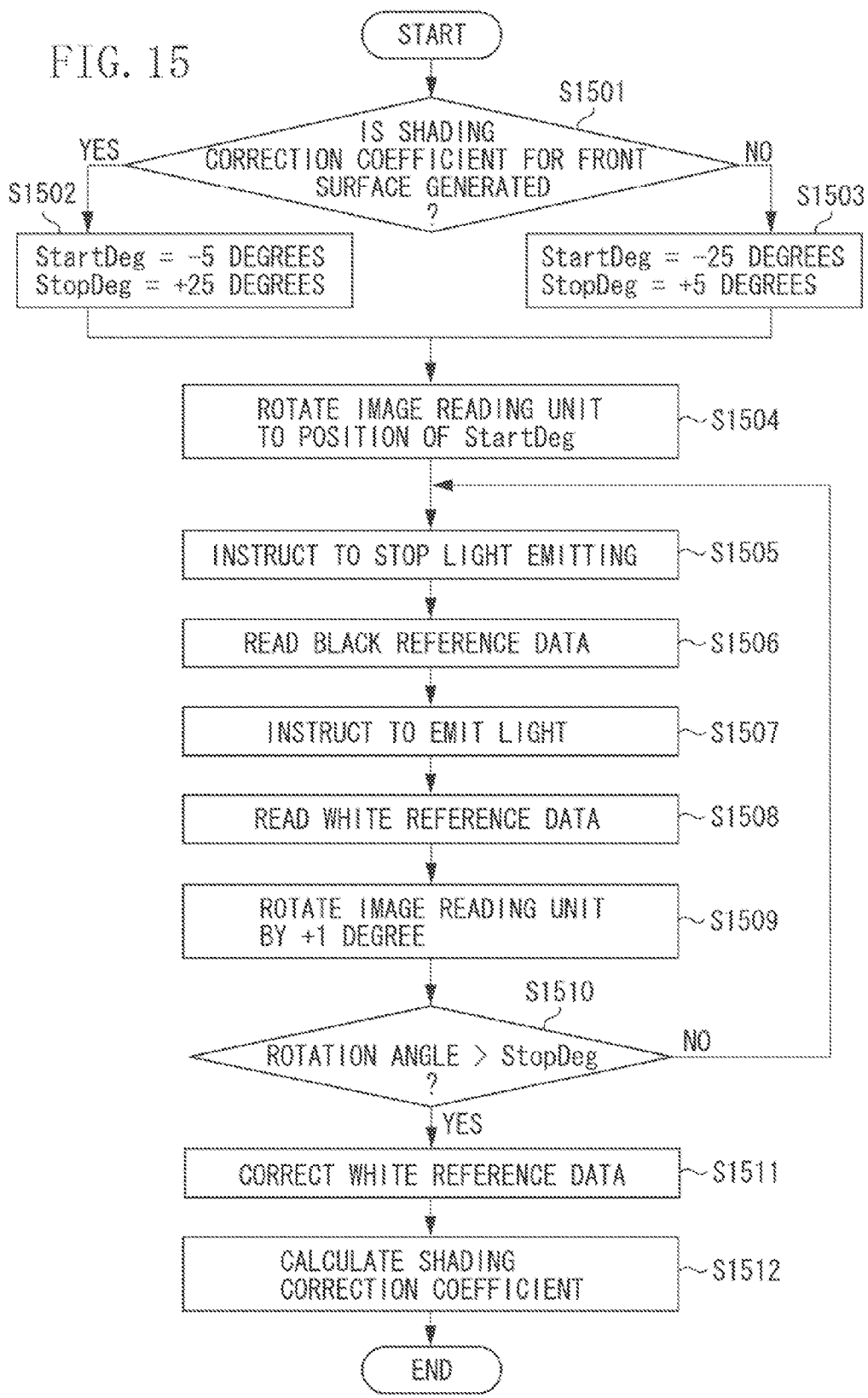

FIG. 16

| ROTATION ANGLE θ | CORRECTION COEFFICIENT |
|---|---|
| −25 DEGREES | 1.411 |
| −24 DEGREES | 1.407 |
| −23 DEGREES | 1.402 |
| −2 DEGREES | 1.024 |
| −1 DEGREES | 1.009 |
| 0 DEGREES | 1.000 |
| +1 DEGREE | 1.009 |
| +2 DEGREES | 1.024 |
| +3 DEGREES | 1.039 |
| +23 DEGREES | 1.402 |
| +24 DEGREES | 1.407 |
| +25 DEGREES | 1.411 |

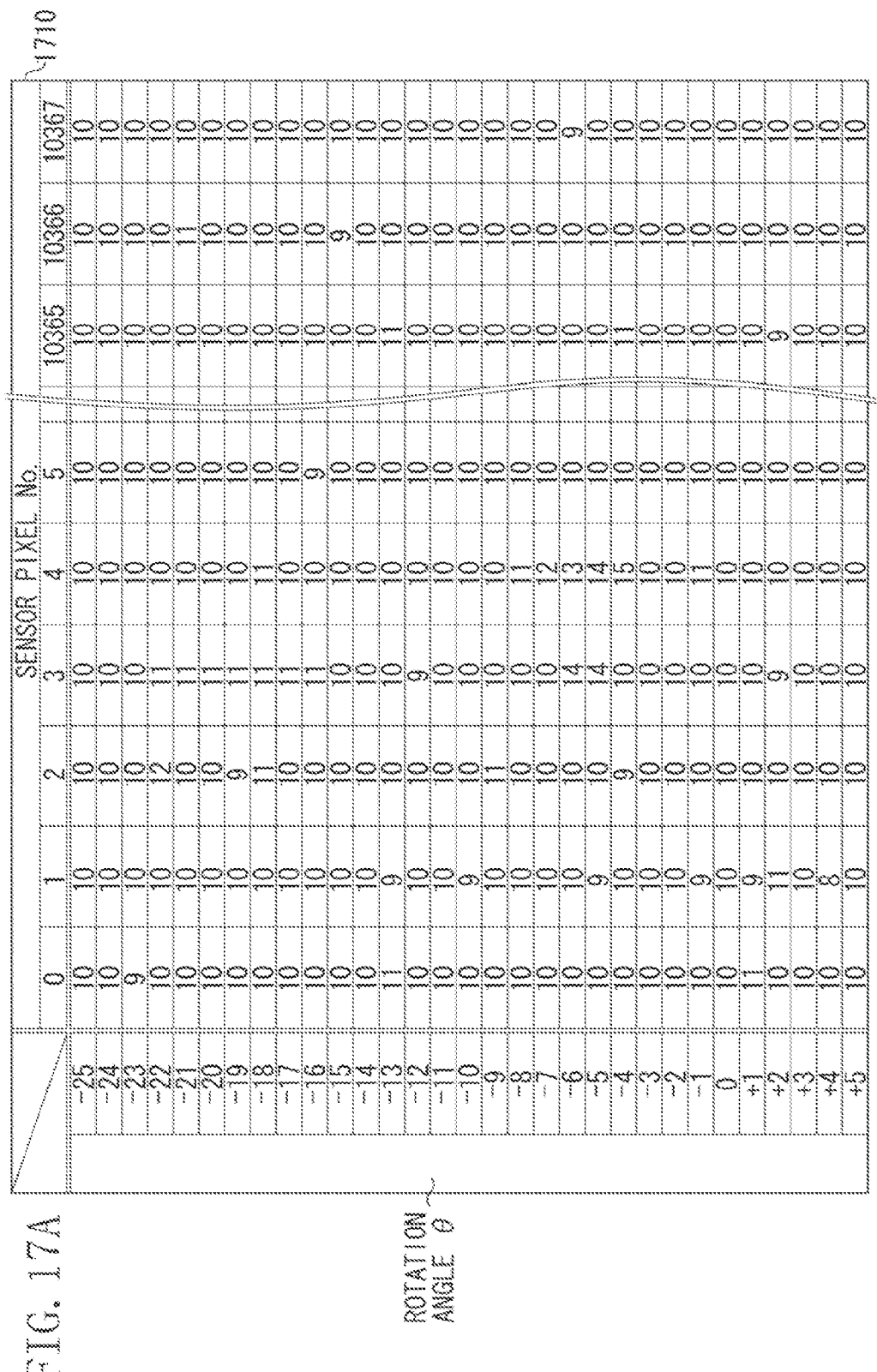

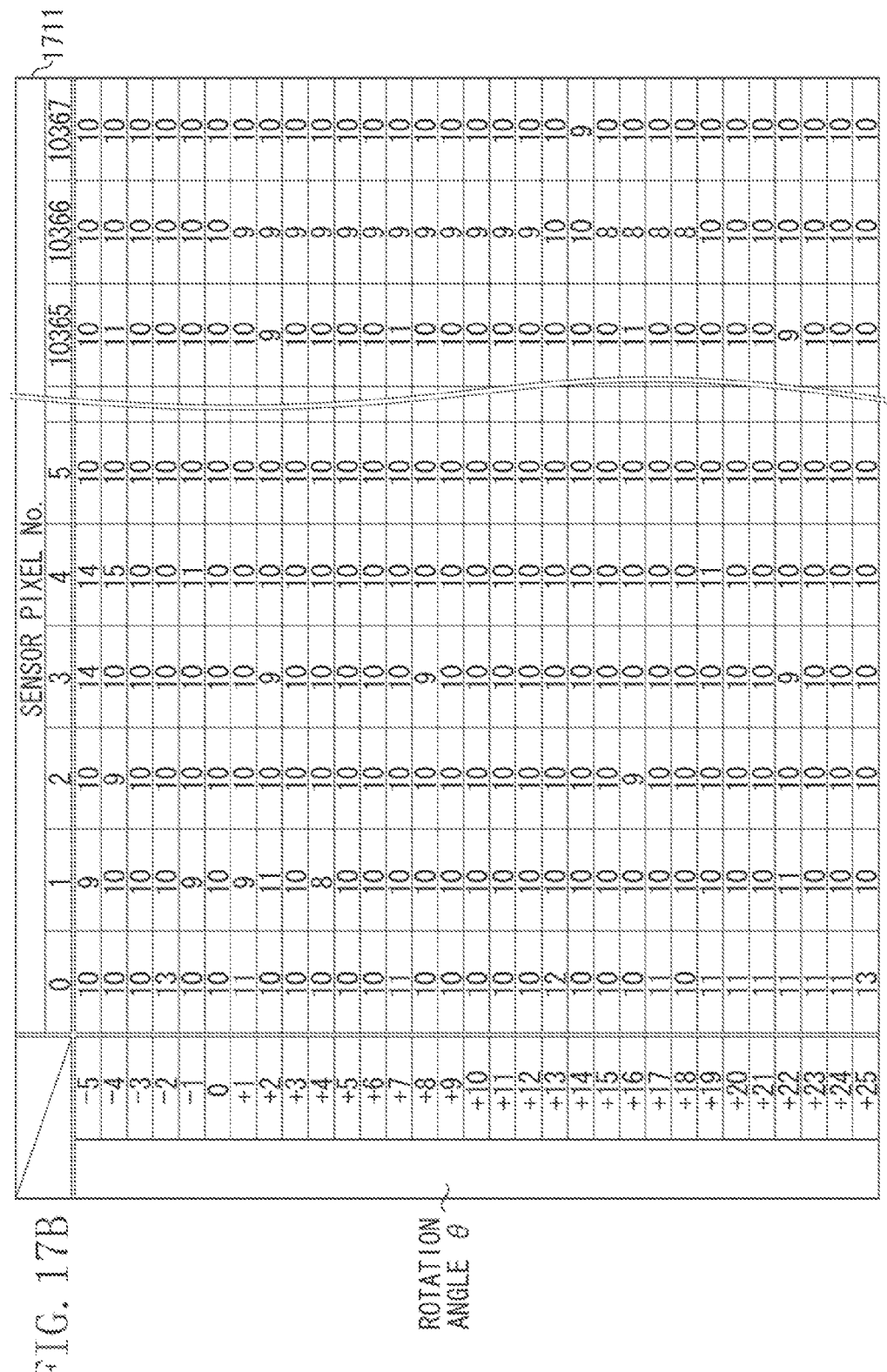

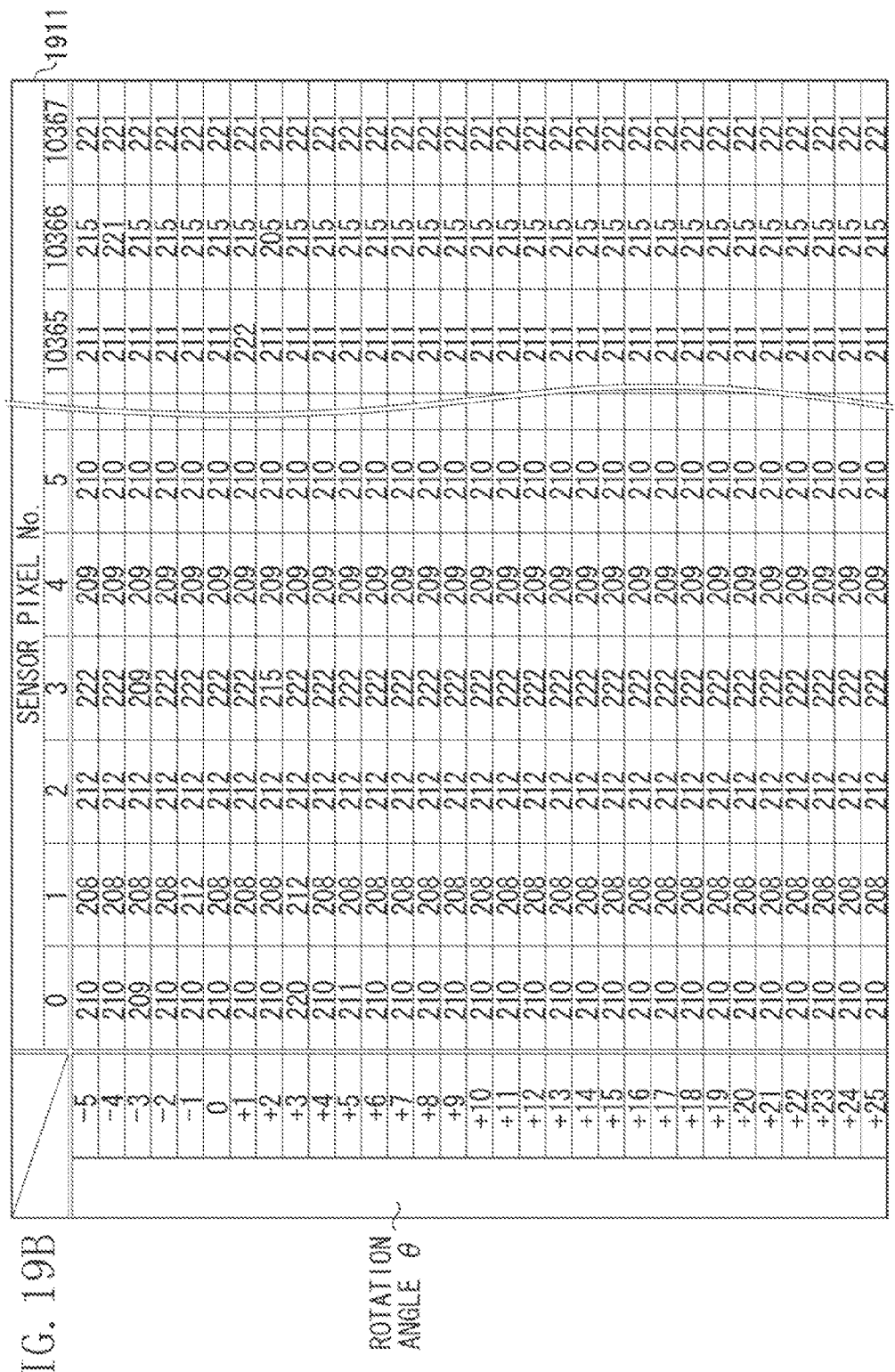

FIG. 20A

| SENSOR PIXEL No. | 0 | 1 | 2 | 3 | 4 | 5 | ... | 10365 | 10366 | 10367 |
|---|---|---|---|---|---|---|---|---|---|---|
| BLACK REFERENCE CORRECTION VALUE | 10 | 10 | 10 | 10 | 11 | 10 | | 10 | 10 | 10 |

FIG. 20B

| SENSOR PIXEL No. | 0 | 1 | 2 | 3 | 4 | 5 | ... | 10365 | 10366 | 10367 |
|---|---|---|---|---|---|---|---|---|---|---|
| BLACK REFERENCE CORRECTION VALUE | 11 | 10 | 10 | 10 | 11 | 10 | | 10 | 9 | 10 |

FIG. 20C

| SENSOR PIXEL No. | 0 | 1 | 2 | 3 | 4 | 5 | ... | 10365 | 10366 | 10367 |
|---|---|---|---|---|---|---|---|---|---|---|
| WHITE REFERENCE CORRECTION VALUE | 210 | 209 | 212 | 221 | 209 | 210 | ... | 211 | 216 | 222 |

FIG. 20D

| SENSOR PIXEL No. | 0 | 1 | 2 | 3 | 4 | 5 | ... | 10365 | 10366 | 10367 |
|---|---|---|---|---|---|---|---|---|---|---|
| WHITE REFERENCE CORRECTION VALUE | 210 | 208 | 212 | 221 | 209 | 210 | ... | 211 | 215 | 221 |

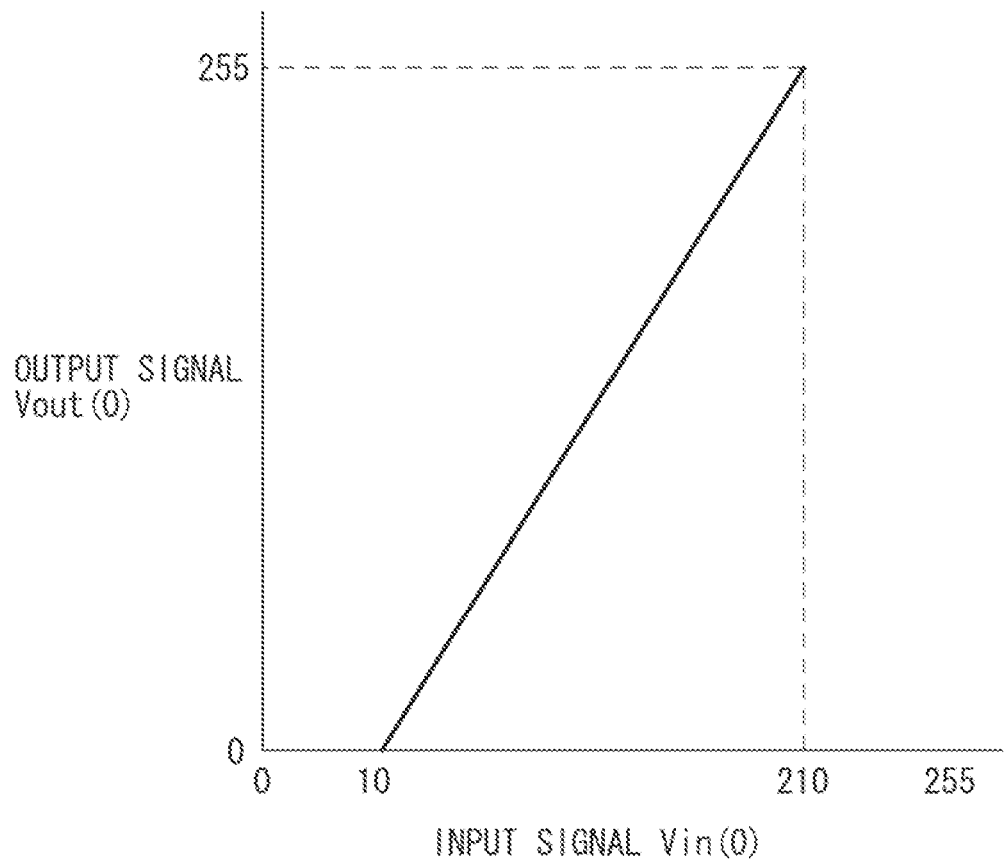

FIG. 23A

| ROTATION ANGLE θ | RECEIVED LIGHT AMOUNT |
|---|---|
| −15 DEGREES | 166 |
| −14 DEGREES | 167 |
| −13 DEGREES | 170 |
| −2 DEGREES | 199 |
| −1 DEGREES | 200 |
| 0 DEGREES | 205 |
| +1 DEGREE | 208 |
| +2 DEGREES | 210 |
| +3 DEGREES | 208 |
| +13 DEGREES | 180 |
| +14 DEGREES | 177 |
| +15 DEGREES | 175 |

FIG. 23B

| ROTATION ANGLE θ | RECEIVED LIGHT AMOUNT |
|---|---|
| −15 DEGREES | 170 |
| −14 DEGREES | 173 |
| −13 DEGREES | 175 |
| −2 DEGREES | 205 |
| −1 DEGREES | 208 |
| 0 DEGREES | 210 |
| +1 DEGREE | 208 |
| +2 DEGREES | 205 |
| +3 DEGREES | 201 |
| +13 DEGREES | 175 |
| +14 DEGREES | 173 |
| +15 DEGREES | 170 |

FIG. 23C

| ROTATION ANGLE θ | RECEIVED LIGHT AMOUNT |
|---|---|
| −15 DEGREES | 175 |
| −14 DEGREES | 177 |
| −13 DEGREES | 179 |
| −2 DEGREES | 210 |
| −1 DEGREES | 208 |
| 0 DEGREES | 205 |
| +1 DEGREE | 201 |
| +2 DEGREES | 198 |
| +3 DEGREES | 197 |
| +13 DEGREES | 170 |
| +14 DEGREES | 167 |
| +15 DEGREES | 166 |

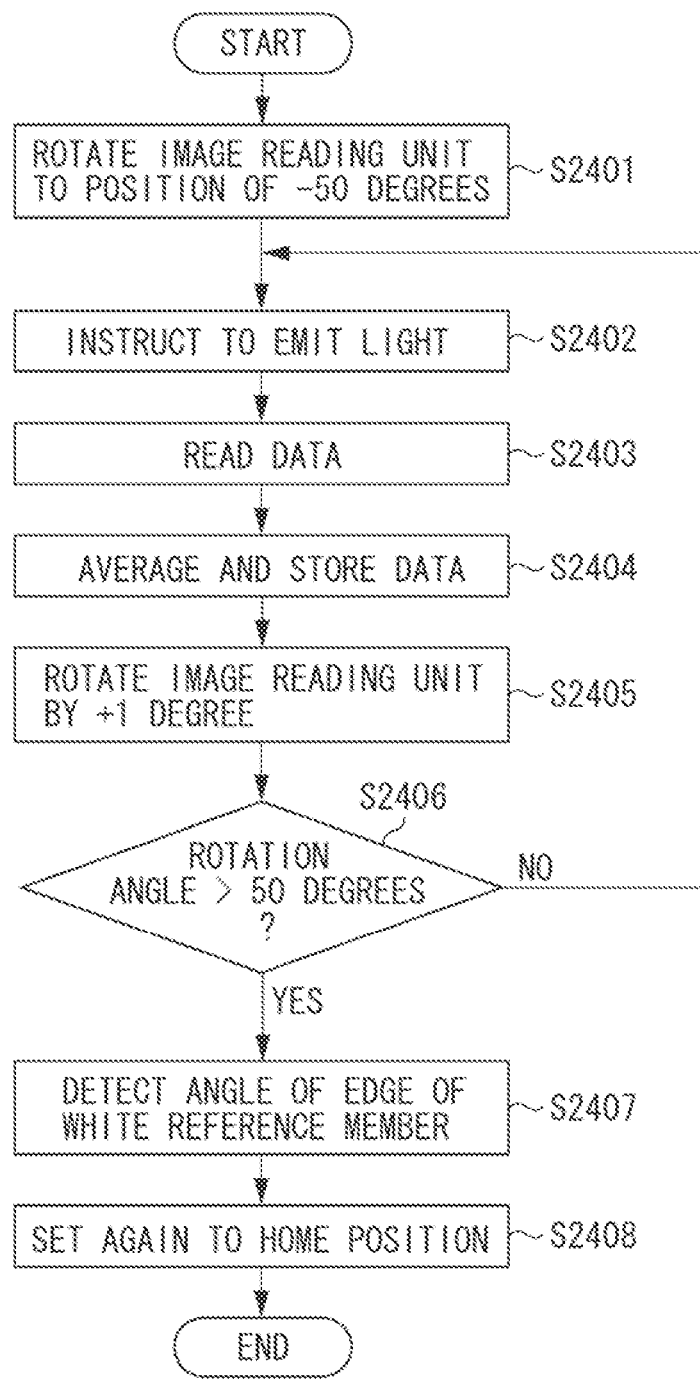

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium.

2. Description of the Related Art

A moving-type image reading unit in an image reading apparatus typified by a conventional flatbed image reading apparatus moves while increasing the speed of a carriage up to an effective readable range. The image reading unit reads the density of a white reference plate while moving to generate shading data for correcting shading (refer to Japanese Patent Application Laid-Open No. 4-265070). A stationary-type image reading unit in an image reading apparatus typified by a sheet-through image reading apparatus reads the density of a white reference plate or a white roller arranged on a surface facing the stationary image reading unit to generate shading correction data for correcting shading.

In Japanese Patent Application Laid-Open No. 4-265070, since the image reading unit reads the white reference plate while moving in parallel with the white reference plate, no matter where the image reading unit is moved, reading of the white reference plate exhibits a constant value. However, if the image reading unit cannot move in parallel with the white reference plate, the reading value obtained from the white reference plate changes depending on a positional relationship between the image reading unit and the white reference plate. For example, the longer the distance between the image reading unit and the white reference plate, the smaller the luminance value obtained by reading the white reference plate.

SUMMARY OF THE INVENTION

The present invention is directed to an image processing apparatus capable of a high-accuracy shading correction even if a white reference plate is read by a rotating image reading unit to perform a shading correction.

According to an aspect of the present invention, an image processing apparatus includes an acquisition unit configured to acquire luminance information of a white reference member by reading the white reference member with an image reading unit including a sensor while rotating the image reading unit in units of a predetermined angle, and a correction unit configured to correct the luminance information acquired by the acquisition unit using a correction coefficient predetermined for each rotation angle of the image reading unit.

According to an exemplary embodiment of the present invention, a high-accuracy shading correction can be performed by correcting the read value using a correction coefficient determined for each rotation angle even if the white reference plate is read while rotating the image reading unit to perform the shading correction.

Further features of the present invention will become apparent from the following description of exemplary embodiments with reference to the attached drawings.

BRIEF DESCRIPTION OF THE DRAWINGS

FIGS. 12F and 12G illustrate the configuration of the image reading unit.

FIG. 13 illustrates the correspondence relationship between the rotation angle and the received light amount of the image reading unit according to a third exemplary embodiment.

FIGS. 14A and 14B illustrate the correspondence relationship between the rotation angle and the received light amount of the image reading unit according to the first exemplary embodiment.

FIG. 15 is a flow chart of a shading correction program.

FIG. 16 illustrates correction coefficients for respective rotation angles of the image reading unit.

FIGS. 17A and 17B illustrate black reference data groups received by a contact image sensor (CIS) according to the first exemplary embodiment.

FIGS. 19A and 19B illustrate white reference data groups corrected using the correction coefficients according to the first exemplary embodiment.

FIGS. 20A, 20B, 20C, and 20D illustrate black reference correction values and white reference correction values according to the first exemplary embodiment.

FIG. 22 illustrates an example of the shading correction.

FIGS. 23A, 23B, and 23C illustrate the correspondence relationship between the rotation angle and the received light amount of the image reading unit according to a second exemplary embodiment.

FIG. 24 is a flow chart illustrating a process for correcting the home position of the image reading unit according to a third exemplary embodiment.

DESCRIPTION OF THE EMBODIMENTS

Various exemplary embodiments, features, and aspects of the invention will be described in detail below with reference to the drawings.

Figure 1:
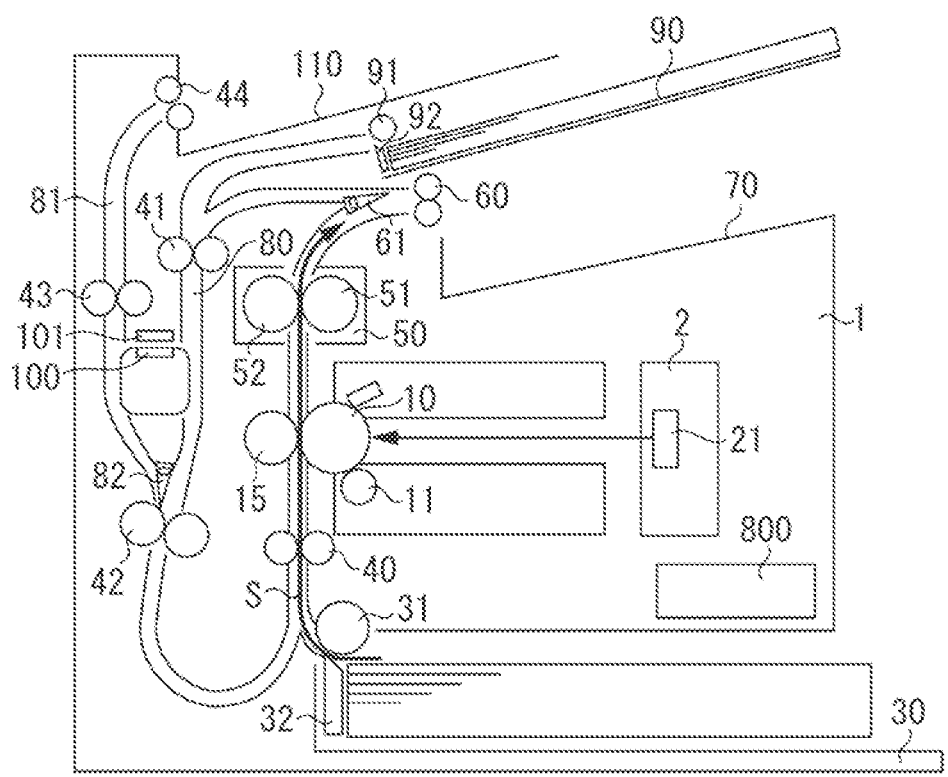
FIG. 1 is a cross section of an image processing apparatus being an example of a printing apparatus according to a first exemplary embodiment of the present invention.

FIG. 1 is a cross section of an image processing apparatus 1 being an example of a printing apparatus according to a first exemplary embodiment of the present invention. A photosensitive drum 10 and a developing roller 11 are arranged in the image processing apparatus 1. The photosensitive drum 10 is a rotatable image bearing member. The developing roller 11 is in contact with the photosensitive drum 10 in parallel with each other and rotated with holding toner. When an optical unit 2 receives a print signal, a light emitting unit 21 irradiates the surface of the rotating photosensitive drum 10 with a laser beam. A latent image is formed by a charge on the surface of the photosensitive drum 10 irradiated with the laser beam. When the developing roller 11 supplies toner to the latent image formed on the surface of the photosensitive drum 10 while being rotated, a toner image is formed on the surface of the photosensitive drum 10.

A first paper feed unit 30 stores a recording material such as paper or overhead projector (OHP) sheets. The recording material S stored in the first paper feed unit 30 is conveyed one by one by a cassette (CST) pickup roller 31 and a separation unit 32 to a conveyance roller 40. In FIG. 1, a thick arrow indicates the recording material S and a direction in which the recording material S proceeds. The conveyance roller 40 adjusts timing so that the toner image on the surface of the photosensitive drum 10 agrees with the leading edge of the recording material S and conveys the recording material S to a transfer unit 15.

The rotation of the photosensitive drum 10 causes the toner image to proceed to the transfer unit 15. The toner image is transferred to the recording material S by an application bias and pressure provided for the transfer unit 15. The transfer unit 15 conveys the recording material S to a fixing unit 50. In the fixing unit 50, the toner image is fixed on the recording material S by heat of a rotatable heating roller 51 and pressure of a pressure roller 52. The recording material S on which the toner image is fixed is conveyed to a discharge roller 60. In one-sided printing, the discharge roller 60 conveys the recording material S to outside the apparatus and the recording material S is stacked on a first discharge unit 70.

Figure 2:
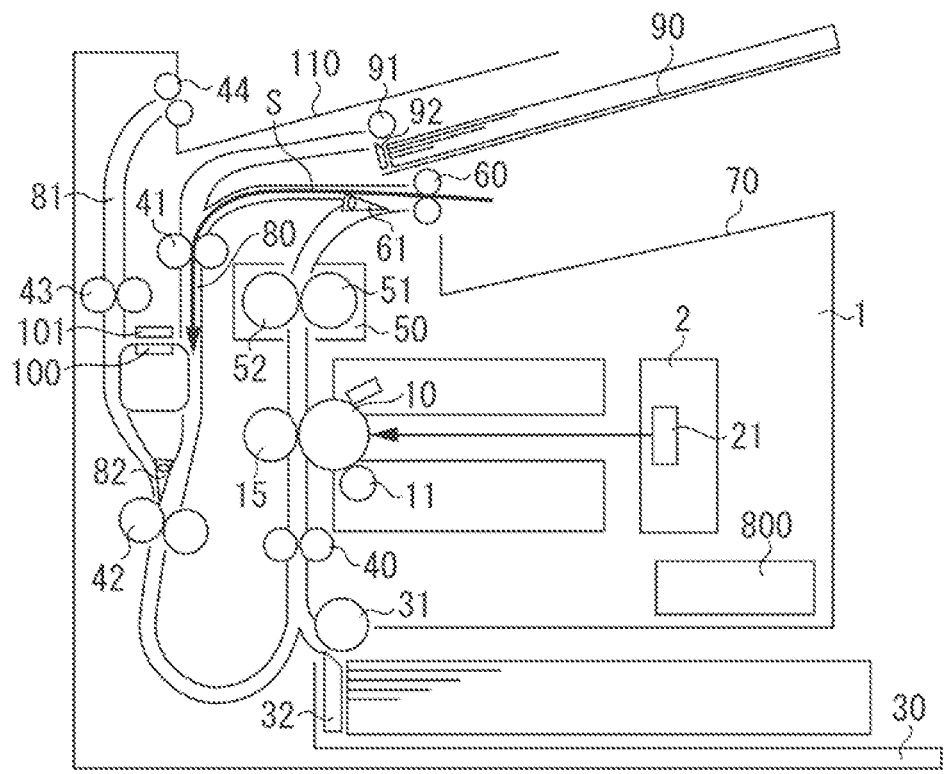
FIG. 2 is a schematic diagram illustrating a two-sided printing process.

FIG. 2 is a schematic diagram illustrating a two-sided printing process. After the trailing edge of the recording material S passes a two-sided flapper (diverter) 61, the two-sided flapper 61 switches a conveyance path. Thereafter, the discharge roller 60 starts to reversely rotate to convey the recording material S to a two-sided conveyance path 80. The recording material S is conveyed to an image reading unit 100 by a conveyance roller 41. After that, the recording material S is conveyed again to the transfer unit 15 by a conveyance roller 42 and the conveyance roller 40. The toner image is transferred and fixed onto the recording material S and then the recording material S on which two-sided printing has been performed is stacked on the first discharge unit 70.

Figure 3:
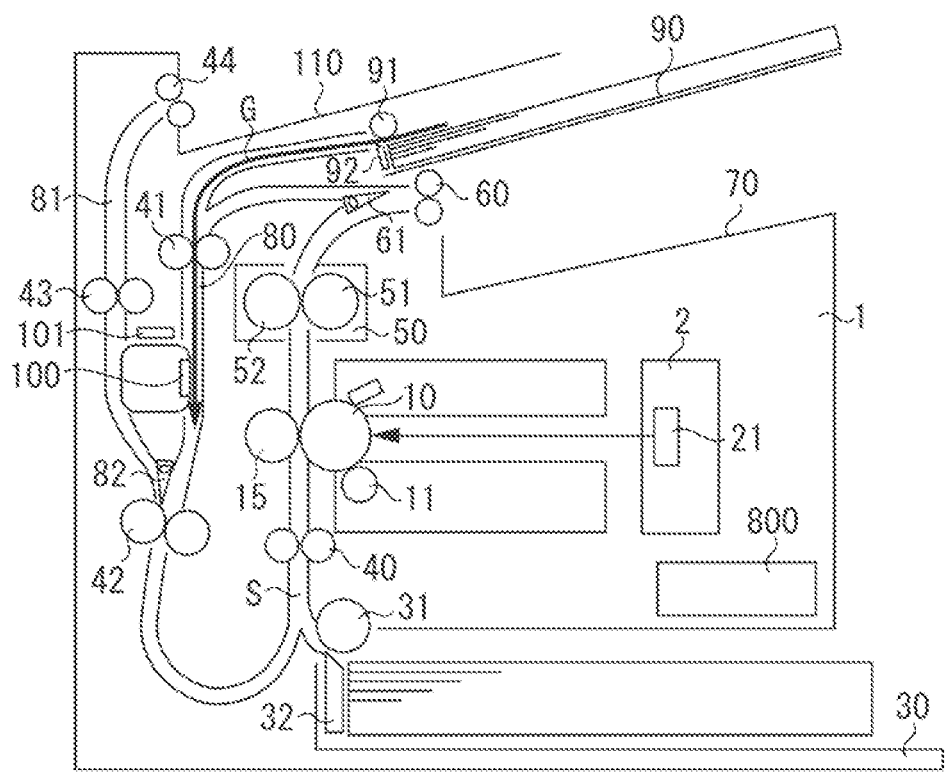
FIG. 3 is a schematic diagram illustrating how the first surface of a document is read.

FIG. 3 is a schematic diagram illustrating how the first surface of a document is read. In FIG. 3, a thick arrow indicates a document G and a direction in which the document G proceeds. The document G stored in a second paper feed unit 90 is conveyed one by one by a contact image sensor (CIS) pickup roller 91 and a separation unit 92 to the conveyance roller 41. Before the image reading unit 100 starts to read the first surface of the document G, the image reading unit 100 calculates a shading correction coefficient for correcting the fluctuation of the output level of an image signal attributed to the non-uniformity in sensitivity of the image reading unit 100 and in light source and light quantity. The shading correction coefficient is calculated from a white reference image obtained by a light emitting element 907 irradiating a white reference member 101 with light and a black reference image read by the image reading unit 100 in a state where the light emitting element 907 does not irradiate, at the position where the image reading unit 100 faces the white reference member 101. The calculated shading correction coefficient is set as a new shading correction coefficient. Thereafter, the image reading unit 100 is rotated to a position where the image reading unit 100 faces the two-sided conveyance path 80. The conveyance roller 41 conveys the document G to the image reading unit 100. The image reading unit 100 standing by at the position where the image reading unit 100 faces the two-sided conveyance path 80 reads the first surface of the document G. The read information is stored in an image memory 804, described in detail in FIG. 8, as image information about the first surface of the document G. The reason the white reference member 101 is caused to face downward is that consideration is taken for the adhesion of dust. The white reference member 101 is used as a reference member. However, a member other than the white reference member 101 may be used as the reference member.

Figure 4:
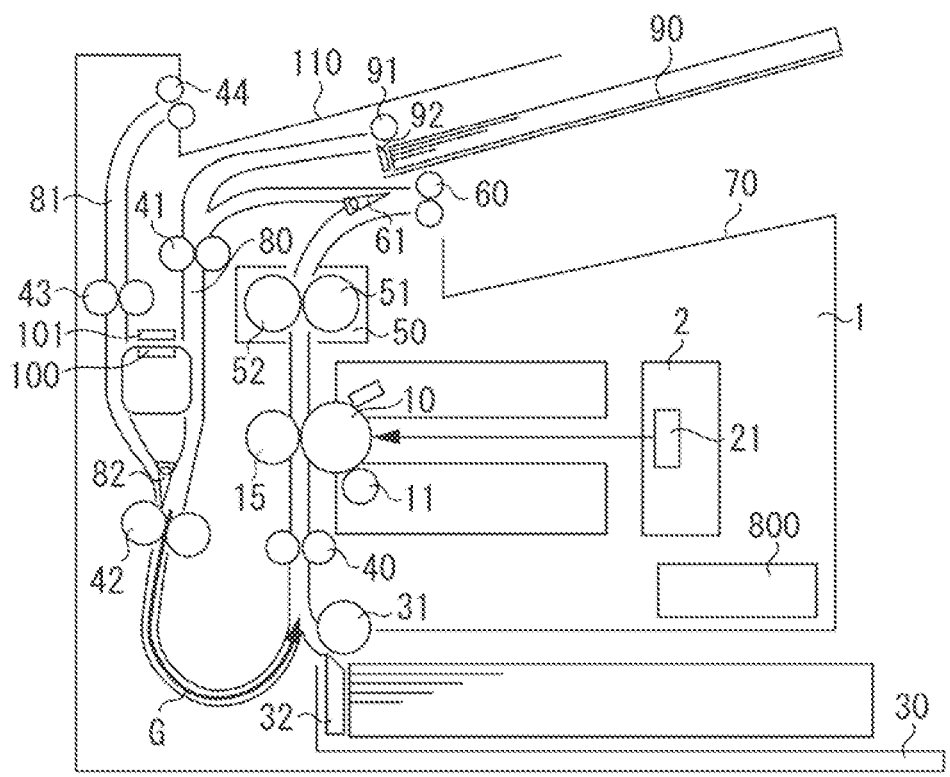
FIG. 4 illustrates a time when the reading of the first surface of the document is ended.

FIG. 4 illustrates a time when the reading of the first surface of the document G is ended. The document G passing the image reading unit 100 is conveyed to the conveyance roller 42. The conveyance roller 42 stops when the trailing edge of the document G passes a switchback flapper 82. At this point, the document G stops with the document G nipped between the conveyance rollers 42. After a predetermined time elapses, the conveyance roller 42 conveys the document G to a document conveyance path 81. The switchback flapper 82 switches the conveyance path from the two-sided conveyance path 80 to the document conveyance path 81 during the predetermined time.

After the image reading unit 100 finishes reading the first surface of the document G, the image reading unit 100 is rotated to a position where the image reading unit 100 faces the white reference member 101. The position where the image reading unit 100 faces the white reference member 101 is in the rotary orbit of the image reading unit 100. The shading correction coefficient is calculated from the white reference image obtained by the light emitting element 907 irradiating the white reference member 101 with light and the black reference image read by the image reading unit 100 in a state where the light emitting element 907 does not irradiate, at the position where the image reading unit 100 faces the white reference member 101. The calculated shading correction coefficient is set as a new shading correction coefficient.

The white reference member 101 is arranged at a midway where the image reading unit 100 finishes reading the first surface of the document G and is rotated to read the second surface of the document G.

Figure 5:
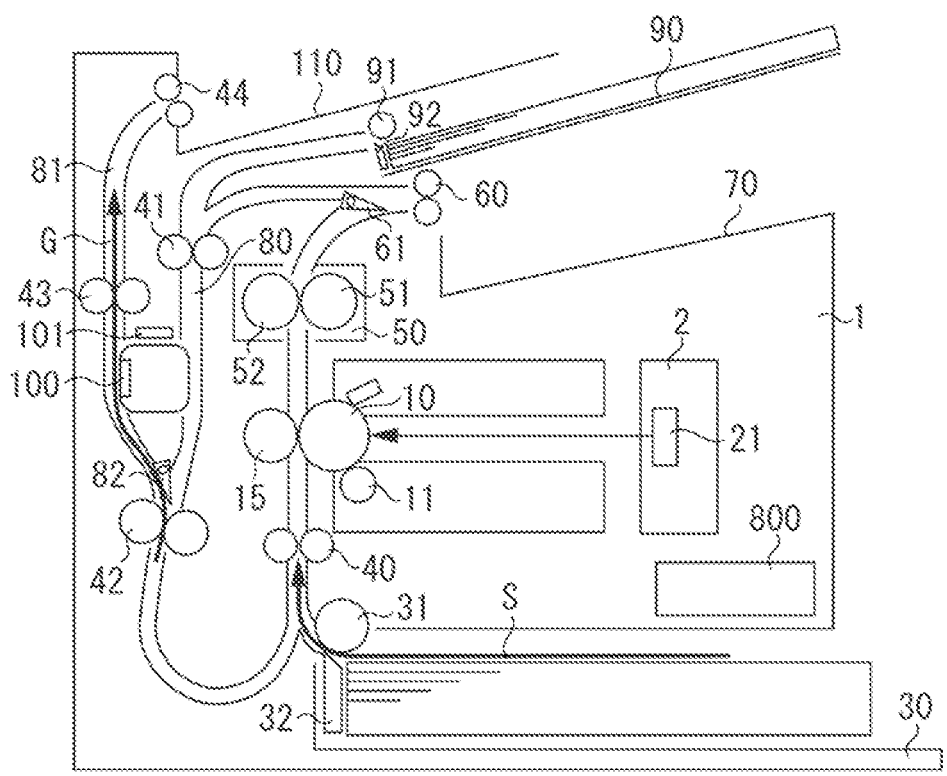
FIG. 5 illustrates how the second surface of the document is read.

FIG. 5 illustrates how the second surface of the document G is read. The switchback flapper 82 switches the conveyance path of the document G from the two-sided conveyance path 80 to the document conveyance path 81, and at the same time the image reading unit 100 is rotated to a position where the image reading unit 100 faces the document conveyance path 81. The conveyance roller 42 starts to reversely rotate to convey the document G to the image reading unit 100. When the document G passes the image reading unit 100, the image reading unit 100 reads the second surface of the document G. The read image information is stored in the image memory 804 as image information of the second surface of the document G.

The recording material S stored in the first paper feed unit 30 is conveyed one by one to the conveyance roller 40. Almost at the same time, the light emitting unit 21 irradiates the surface of the photosensitive drum 10 with a laser beam based on the image information of the second surface of the document G stored in the image memory 804 to form a latent image based on the image information of the second surface of the document G on the surface of the photosensitive drum 10. The transfer unit 15 transfers the toner image formed by the latent image to the recording material S. The fixing unit 50 fixes the toner image onto the recording material S to complete the formation of an image based on the image information of the second surface of the document G. In FIG. 5, the recording material S starts to be conveyed along with the start of reading the second surface of the document G. However, the recording material S may start to be conveyed after the start of reading the second surface of the document G.

Figure 6:
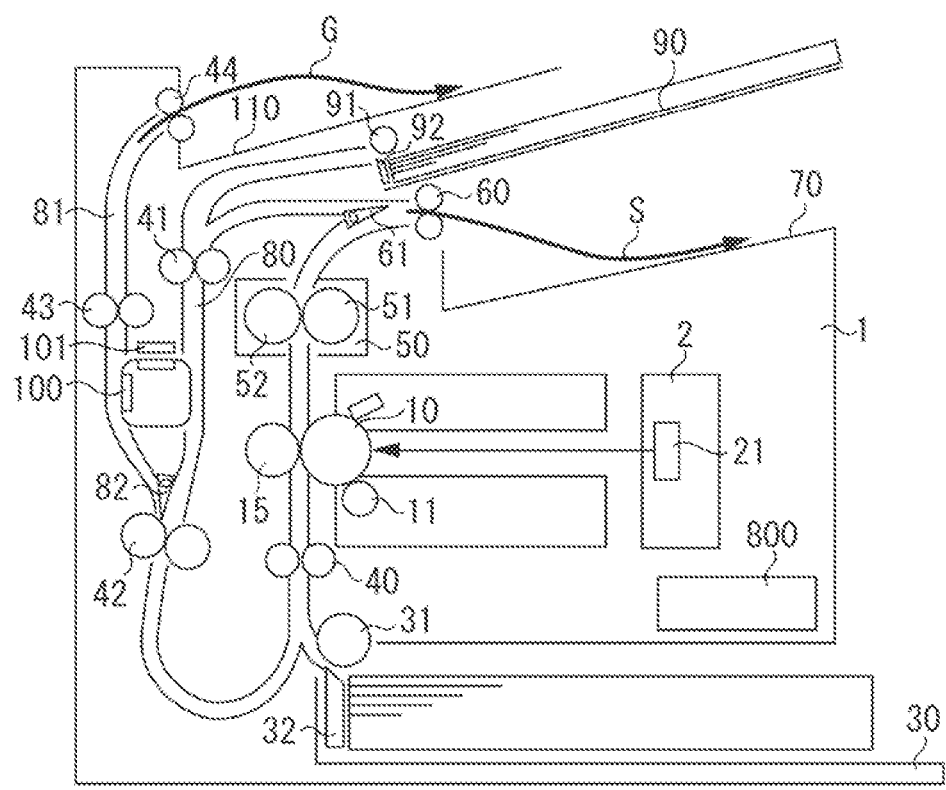
FIG. 6 illustrates a time when the reading of the second surface of the document is ended.

FIG. 6 illustrates a time when the reading of the second surface of the document G is ended. The document G is conveyed to outside the apparatus by conveyance rollers 43 and 44 and stacked on a second discharge unit 110. When the trailing edge of the document G passes the switchback flapper 82, the switchback flapper 82 switches the conveyance path from the document conveyance path 81 to the two-sided conveyance path 80 to cause the conveyance roller to convey the recording material S. The recording material S on which the image of the second surface of the document G has been formed is conveyed by the reverse rotation of the discharge roller 60 to the two-sided conveyance path 80, to which the two-sided flapper 61 has switched the conveyance path.

Figure 7:
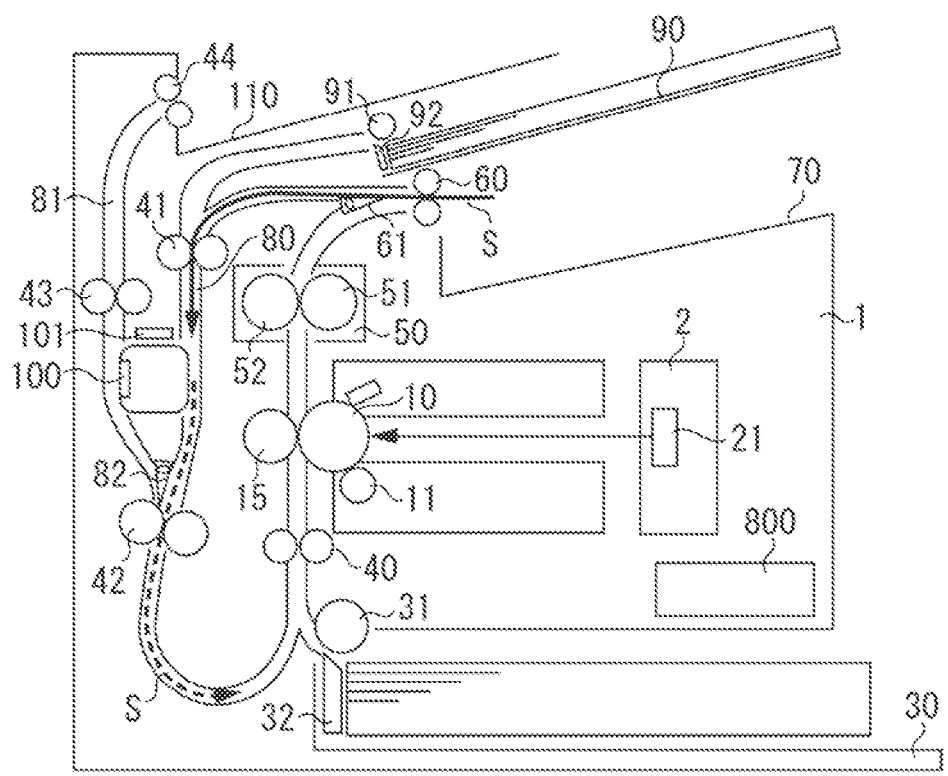
FIG. 7 illustrates how an image is formed based on the image information of the first surface of the document.

FIG. 7 illustrates how an image is formed based on the image information of the first surface of the document G. After the trailing edge of the recording material S passes the two-sided flapper 61, the two-sided flapper 61 switches the conveyance path. Thereafter, the discharge roller 60 starts to reversely rotate to convey the recording material S to the two-sided conveyance path 80. The recording material S conveyed to the two-sided conveyance path 80 passes the image reading unit 100 and conveyed by the conveyance roller 42 to the conveyance roller 40 and conveyed by the conveyance roller 40 to the transfer unit 15. In FIG. 7, a dotted arrow indicates how the recording material S is conveyed. The light emitting unit 21 irradiates the surface of the photosensitive drum 10 with a laser beam based on the image information of the first surface of the document G stored in the image memory 804 to form a latent image on the surface of the photosensitive drum 10 based on the image information of the first surface of the document G. The transfer unit 15 transfers the toner image formed by the latent image to the recording material S. The fixing unit 50 fixes the toner image on the recording material S to complete the formation of an image based on the image information of the first surface of the document G. Thereafter, the recording material S is stacked on the first discharge unit 70.

Hereinafter, the units related to printing such as the photosensitive drum 10, the developing roller 11, the transfer unit 15, and the fixing unit 50 are collectively referred to as a printing unit.

Figure 8:
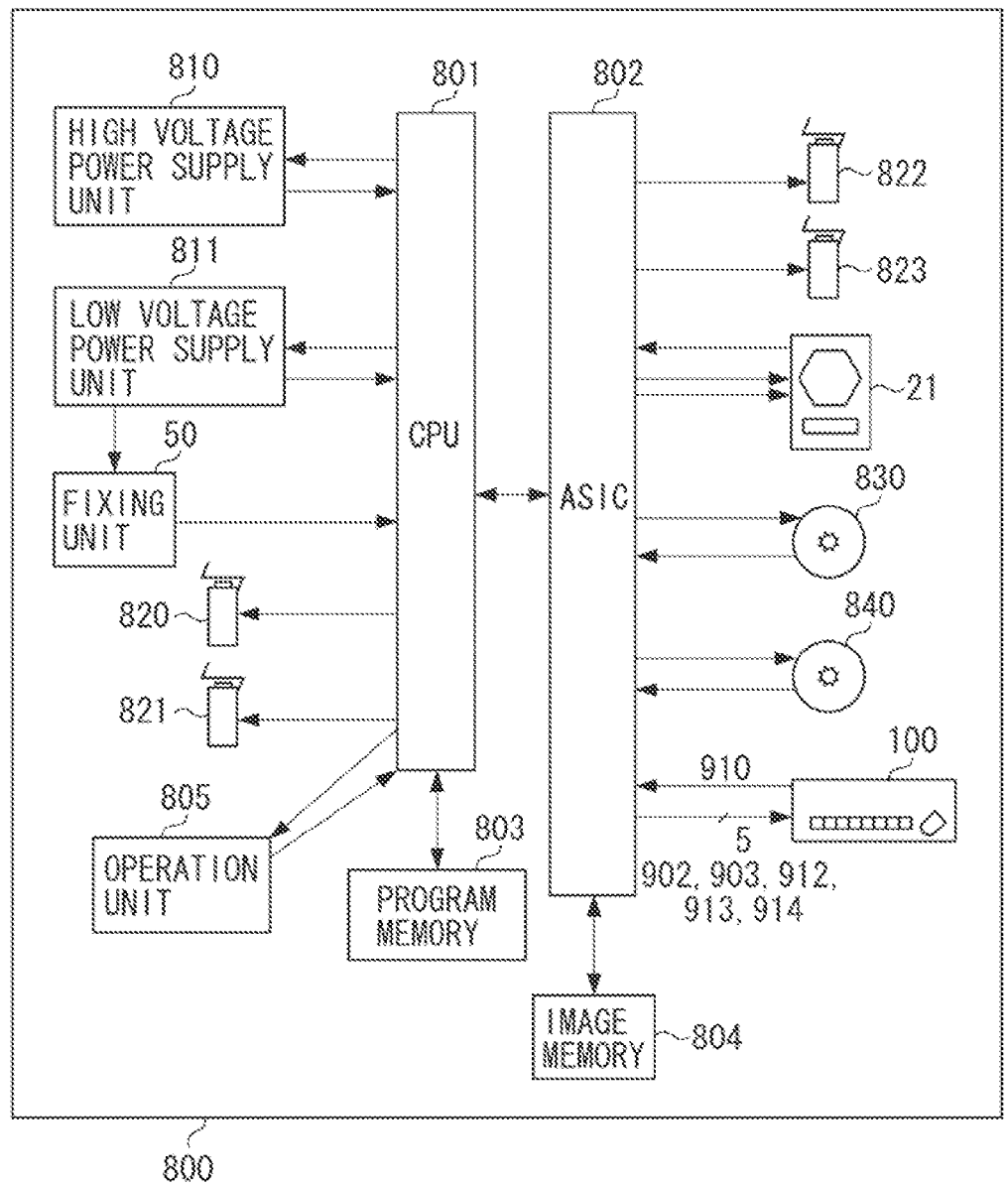
FIG. 8 is a block diagram illustrating the electrical components of the image processing apparatus.

FIG. 8 illustrates the hardware of the image processing apparatus 1. Electrical components 800 of the image processing apparatus 1 are described below with reference to FIG. 8. FIG. 8 illustrates the units controlled by a control central-processing-unit (CPU) 801 (hereinafter referred to as a CPU 801).

The CPU 801 is connected to the light emitting unit 21, including a polygon mirror, a motor, and a laser light emitting element. The CPU 801 transmits a control signal to an application specific integrated circuit (ASIC) 802 to control the light emitting unit 21 to form a desired latent image by scanning a laser beam on the surface of the photosensitive drum 10. The CPU 801 transmits the control signal to the ASIC 802 to control a driving system such as a main motor 830, a two-sided driving motor 840, a CST sheet feeding solenoid 822, and a CIS sheet feeding solenoid 823 for the purpose of conveying the recording material S. The main motor 830 drives a CST pickup roller 31, a conveyance roller 40, a photosensitive drum 10, a transfer unit 15, a heating roller 51, and a pressure roller 52. The CST sheet feeding solenoid 822 is turned on to drive the CST pickup roller 31 when a sheet feeding roller for feeding the recording material S starts to be driven. The two-sided driving motor 840 drives the CIS pickup roller 91 and the conveyance rollers 41 to 44.

The CPU 801 controls a high voltage power supply unit 810 for controlling charge, development, and transfer required for an electro-photographic process and a low voltage power supply unit 811 for controlling fixing. The CPU 801 performs control to monitor temperature by a thermistor (not illustrated) provided on the fixing unit 50.

The CPU 801 is connected to a program memory 803 via a bus. The program memory 803 stores programs and data, thereby to execute all or part of processing performed by the CPU 801. In other words, the CPU 801 executes the following processing using the programs and data stored in the program memory 803.

The ASIC 802 controls the speed of a motor in the light emitting unit 21, a main motor 830, and a two-sided drive motor 840 based on instructions of the CPU 801. In the speed control of the motor, the ASIC 802 detects a tack signal from the motor and transmits an acceleration or a deceleration signal to the motor so that an interval between the tack signals becomes equal to a predetermined period of time. The term "tack signal" refers to a pulse signal that the motor outputs each time the motor rotates. The use of the ASIC 802 brings the advantage that the control load of the CPU 801 is reduced.

The CPU 801 is connected to an operation unit 805. The operation unit 805 includes a display unit such as a touch panel and an operation key. The CPU 801 controls the operation unit 805 to display an operation screen and receives user's instructions via the operation unit 805.

Figure 21:
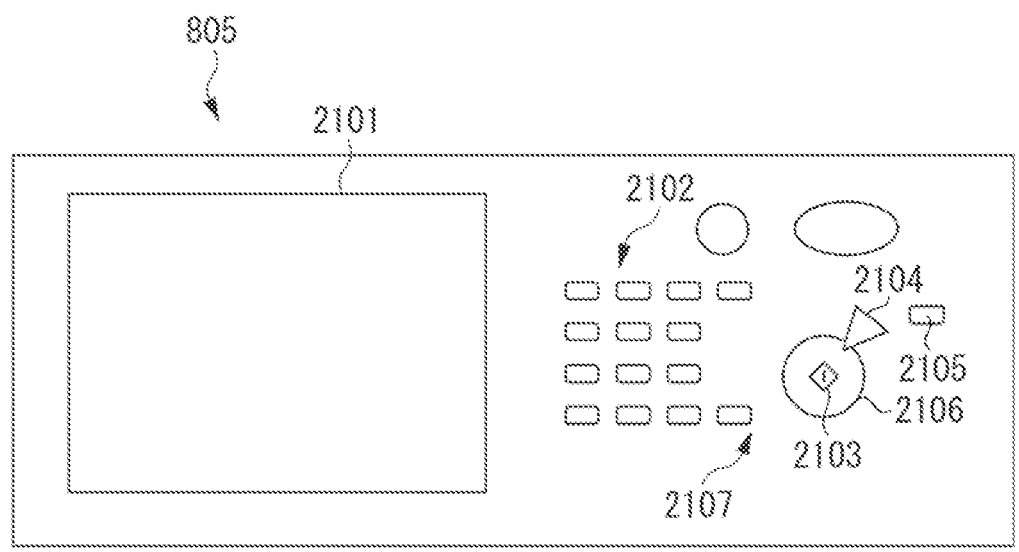
FIG. 21 illustrates an example of an operation unit according to the first exemplary embodiment.

FIG. 21 illustrates an example of the operation unit 805. A display section 2101 is formed of a liquid crystal display to which a touch panel sheet is fixed and displays the operation screen or a soft key. When the soft key is pressed, the display section 2101 transmits positional information indicating a position where the soft key is pressed to the CPU 801. The CPU 801 determines the user's instructions based on the positional information.

A keyboard 2107 includes a ten key 2102, a stop key 2104, a user mode key 2105, and a start key 2106. The ten key 2102 is a key for inputting numerals and characters and used for setting the number of copies and switching a screen. The stop key 2104 is a key for stopping operation. The user mode key 2105 is a key for setting the image processing apparatus 1. The start key 2106 is a key for instructing the start of reading an image and printing.

A two-toned light emitting diode (LED) 2103 is located at the center of the start key 2106. When the LED 2103 is green, the start key 2106 may be used. When the LED 2103 is red, the start key 2106 may not be used.

When the CPU 801 is instructed to perform copying from the operation unit 805 or receives a print command from a host computer, the CPU 801 causes the main motor 830 or the two-sided driving motor 840 to convey the recording material. After the toner image formed on the surface of the photosensitive drum 10 is transferred to the recording material by the transfer unit 15 and fixed onto the recording material S by the fixing unit 50, the recording material S is discharged to the first discharge unit 70. The first discharge unit 70 has a gentle uphill from the vicinity of a discharge port in the direction of discharge of the recording material to neatly arrange the recording materials on which an image has been already formed. The CPU 801 causes the low voltage power supply unit 811 to supply a predetermined power to the fixing unit 50. The fixing unit 50 generates a predetermined quantity of heat and provides the quantity of heat for the recording material to fuse the toner image on the recording material, fixing the toner image thereon.

When the CPU 801 is instructed to perform copying from the operation unit 805 or receives a scan command from the host computer, the CPU 801 drives the two-sided driving motor 840. The torque of the two-sided driving motor 840 is transmitted to the CIS pickup roller 91. The document is conveyed by the CIS pickup roller 91. The image reading unit 100 is connected to the ASIC 802 via signal lines 902, 903, 910, 912, 913, and 914. The ASIC 802 controls the image reading unit 100 according to instructions from the CPU 801 to store the image information read by the image reading unit 100 in the image memory 804.

Figure 9:
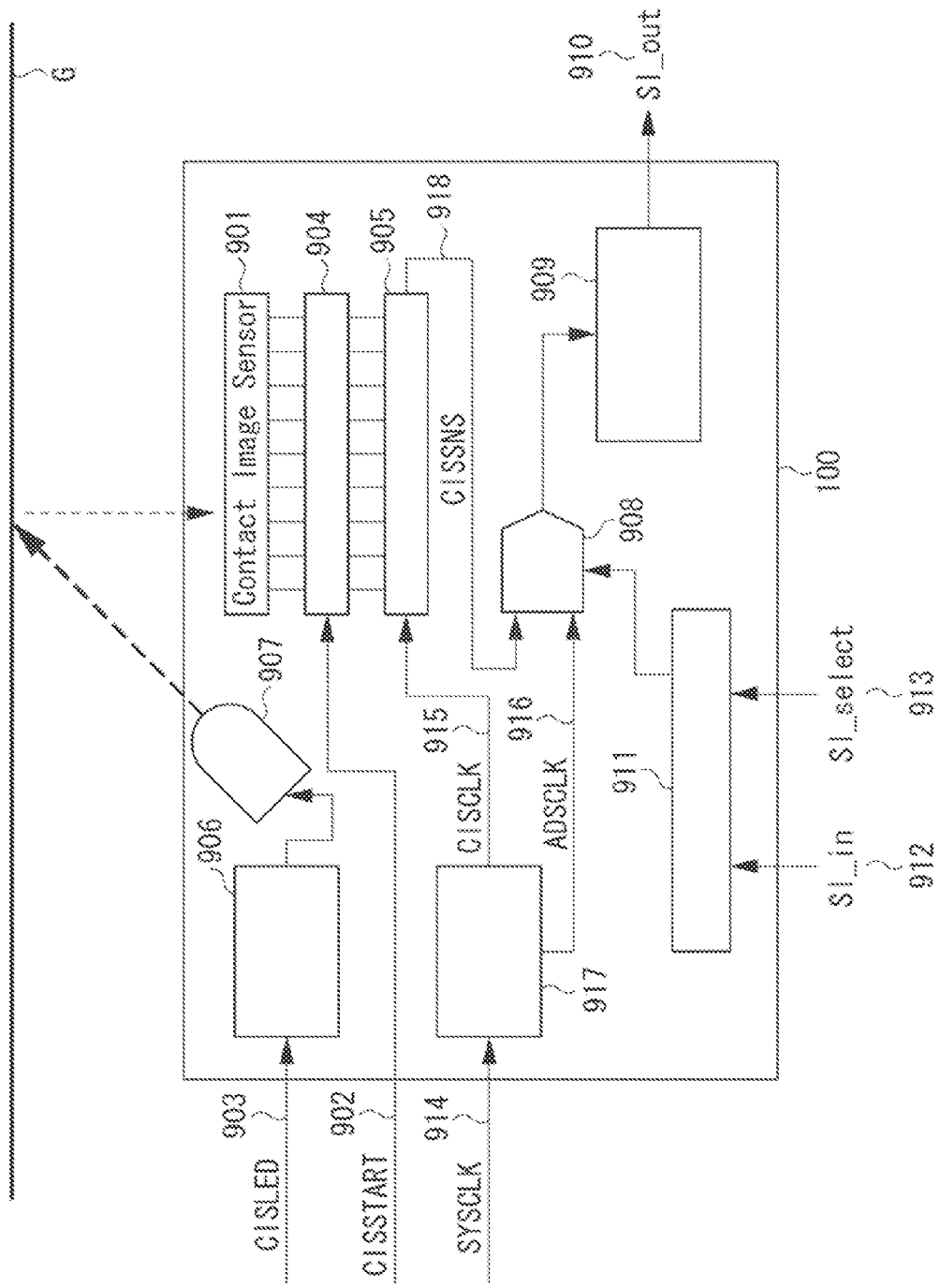
FIG. 9 is a block diagram illustrating in detail an image reading unit.

FIG. 9 is a block diagram illustrating in detail the image reading unit 100. FIG. 9 also illustrates a circuit diagram of a contact image sensor (CIS). In a contact image sensor 901, photo diodes of 10368 pixels, for example, are arranged in an array form at a specific main-scanning density (1200 dpi, for example).

The image reading unit 100 receives a start pulse signal (CISSTART) 902, a light emitting element control signal (CISLED) 903, an S1_in signal 912, an S1_select signal 913, and a system clock (SYSCLK) 914 for determining an operating speed of the CIS. The image reading unit 100 transmits an S1_out signal 910.

The light emitting element 907 uniformly irradiates the document G with light based on the current amplified by a current amplification unit 906.

An active CISSTART signal 902 causes the contact image sensor 901 to start to accumulate charges based on the received light and sequentially set data in an output buffer 904. When a shift register 905 is provided with a transfer clock (CISCLK) 915 (500 kHz to 1 MHz, for example), the shift register 905 transfers the data set in the output buffer 904 to an analog/digital (A/D) converter 908 as a CISSNS signal 918.

Because the CISSNS signal 918 has a predetermined data security area, the CISSNS signal 918 is sampled after a predetermined time elapses since the transfer clock 915 rises. The CISSNS signal 918 is output in synchronization with both edges of the rising and falling of the transfer clock 915. The frequency of a CIS sampling clock (ADCLK) 916 determining the sampling speed of the A/D converter 908 is made double that of the transfer clock 915. The CISSNS signal 918 is sampled at the edge of the rising of the CIS sampling clock 916. A timing generator 917 divides the system clock 914 to generate the CIS sampling clock 916 and the transfer clock 915. The CIS sampling clock 916 is later in phase than the transfer clock 915 by the data security area.

The CISSNS signal 918 analog-to-digital converted by the A/D converter 908 is transmitted as an S1_out signal 910 by an output interface circuit 909 at a predetermined timing. The S1_out signal 910 is serial data. At this point, the CISSNS signal 918 for the predetermined number of pixels from the CISSTART signal 902 is an analog output reference voltage, so that the CISSNS signal 918 is not used as an effective pixel.

A control circuit 911 can variably control an A/D conversion gain of the A/D converter 908 according to an S1_in signal 912 and an S1_select signal 913. For example, if the contrast of a captured image is not appropriately obtained, the CPU 801 instructs the control circuit 911 to increase the A/D conversion gain of the A/D converter 908, thereby increasing the contrast. This allows an image to be captured with the best contrast.

In FIG. 9, an example is described in which all pixels are output one by one as the CISSNS signal 918. However, a plurality of pixels is divided for each area and a plurality of areas may be analog-to-digital (A/D) converted in parallel to read images at a high speed. In FIG. 9, the CIS is used in the image reading unit 100. However, a complementary metal-oxide semiconductor (CMOS) sensor or a charge-coupled device (CCD) sensor may be used as the image reading unit 100.

Figure 10:
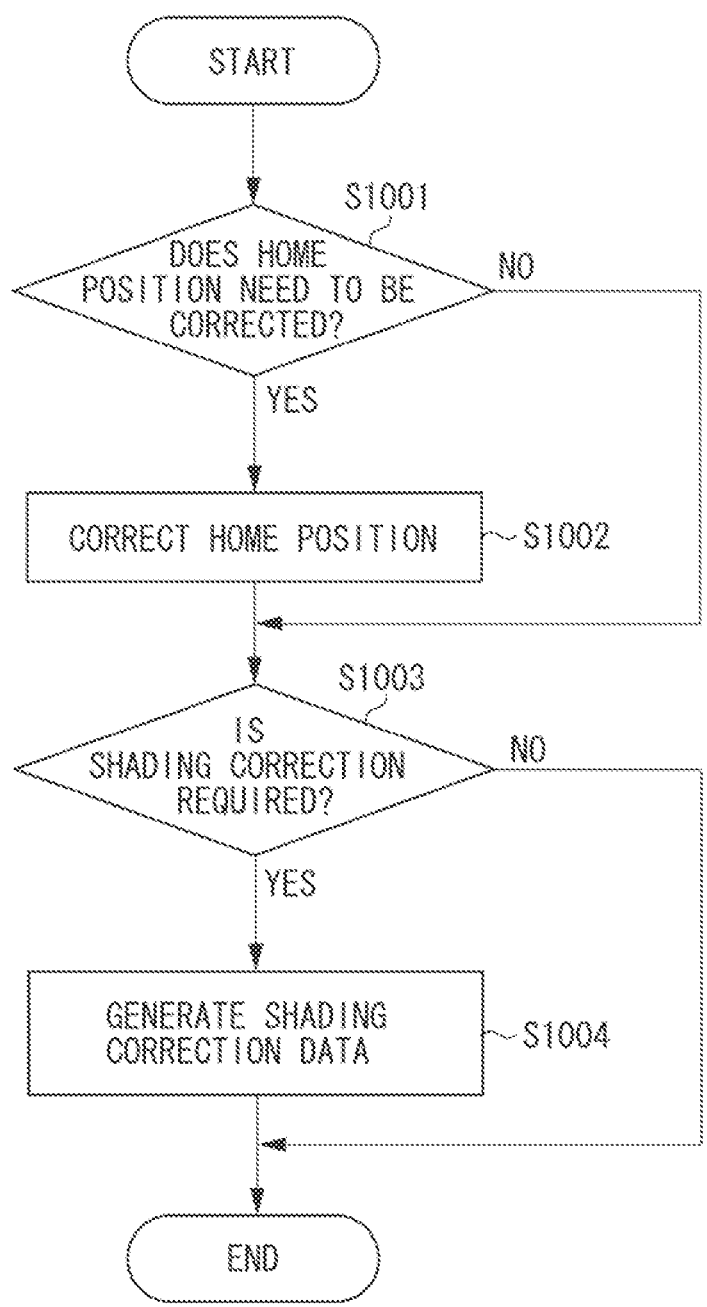
FIG. 10 is a flow chart illustrating a shading correction process executed by the image processing apparatus according to the exemplary embodiment of the present invention.

FIG. 10 is a flow chart of a shading correction process executed by the image processing apparatus 1. In the present exemplary embodiment, the CPU 801 executes the control program based on the flow chart to execute the following correction processing.

Figure 12A:
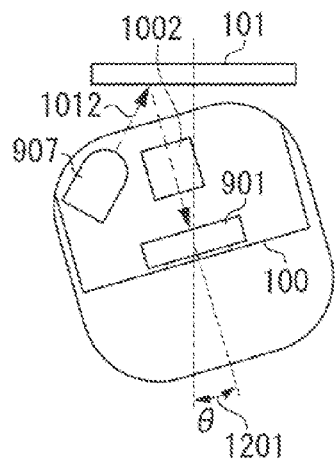
FIGS. 12A, 12B, 12C, 12D, and 12E illustrate states where the image reading unit is rotated
Figure 12B:
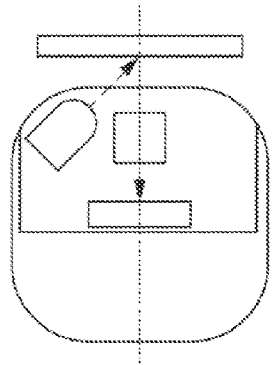

In step S1001, the CPU 801 determines whether the image reading unit 100 corrects a reference position (a home position). When the image reading unit 100 reads the white reference member 101 to acquire the shading correction coefficient, the image reading unit 100 lies in a position where the image reading unit 100 faces the white reference member 101 (positions 100 and 101 in FIG. 2). Idealistically, the image reading unit 100 lies in a position where the image reading unit 100 faces the white reference member 101 immediately before the image reading unit 100 acquires the shading correction coefficient (refer to FIG. 12B). However, the image reading unit 100 deviates from the reference position owing to aging of the image reading unit 100 and vibration from the outside. If the image reading unit 100 deviates from the reference position, the position where the image reading unit 100 deviates therefrom is determined as the reference position, a deviating angle, which is different from a rotation angle that should be originally multiplied, is multiplied by a correction coefficient for each rotation angle in FIG. 16 described below. For example, if the image reading unit 100 deviates by two degrees from the reference position due to aging, data read at the position where the image reading unit 100 deviates by two degrees therefrom are multiplied by a correction coefficient of 1.00 (a correction coefficient of a rotation angle of zero degrees).

Such a problem arises, so that the reference position of the image reading unit 100 needs to be corrected to a position with a rotation angle of zero degrees.

After the image processing apparatus 1 is installed or a predetermined time elapses since the previous printing is ended or immediately before a scan job is executed or at the timing immediately before the image reading unit 100 reads a document, the CPU 801 determines that the reference position needs to be corrected (YES in step S1001), the processing proceeds to step S1002.

In step S1001, if the CPU 801 determines that the image reading unit 100 corrects the home position, then in step S1002, the CPU 801 executes a program for correcting the home position of the image reading unit 100. A detailed program for correcting the home position is described below with reference to FIG. 11.

In step S1003, the CPU 801 determines whether to apply the shading correction for capturing an image with a uniform brightness from a document to be read to luminance unevenness due to a light source and a characteristic of the CIS 901 in the image reading unit 100. In step S1003, the processing is performed immediately before a scan job is executed or the image reading unit 100 reads the document, or when information is received from various sensors provided inside the image processing apparatus 1 or after the printing of the prescribed number is ended. If it is determined that the shading correction is performed (YES in step S1003), the CPU 801 executes the shading correction program for the CIS 901 of the image reading unit 100. The detail of the shading correction program is described below with reference to FIG. 15. The home position may be corrected in step S1002 after the shading correction program is executed in step S1004.

The program for correcting the home position of the image reading unit 100 executed in step S1002 in FIG. 10 is described below with reference to the flow chart of FIG. 11, FIGS. 12A, 12B, 12C, 12D, 12E, 12F, and 12G, and FIGS. 14A and 14B. FIG. 12 illustrates an example in which the home position of the image reading unit 100 deviates by θ=2 degrees in the clockwise direction (refer to 1202 in FIG. 12C). If the image reading unit 100 tilts in the clockwise direction (in a state of FIG. 12C) from an idealistic state where the image reading unit 100 does not tilt (refer to FIG. 12B), a rotation angle θ becomes plus (+), and if the image reading unit 100 tilts in the counterclockwise direction (in a state of FIG. 12A), a rotation angle θ becomes minus (−).

Figure 12C:
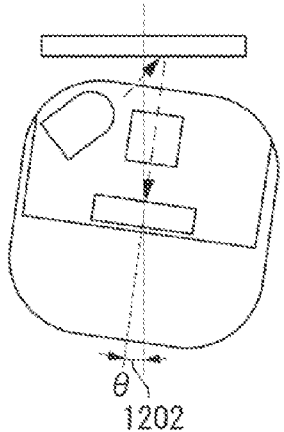
Figure 12D:
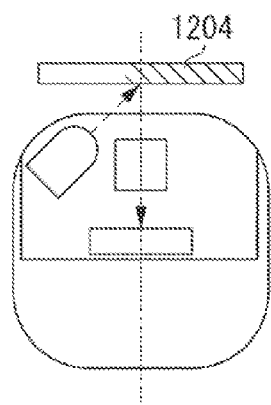
Figure 14A:
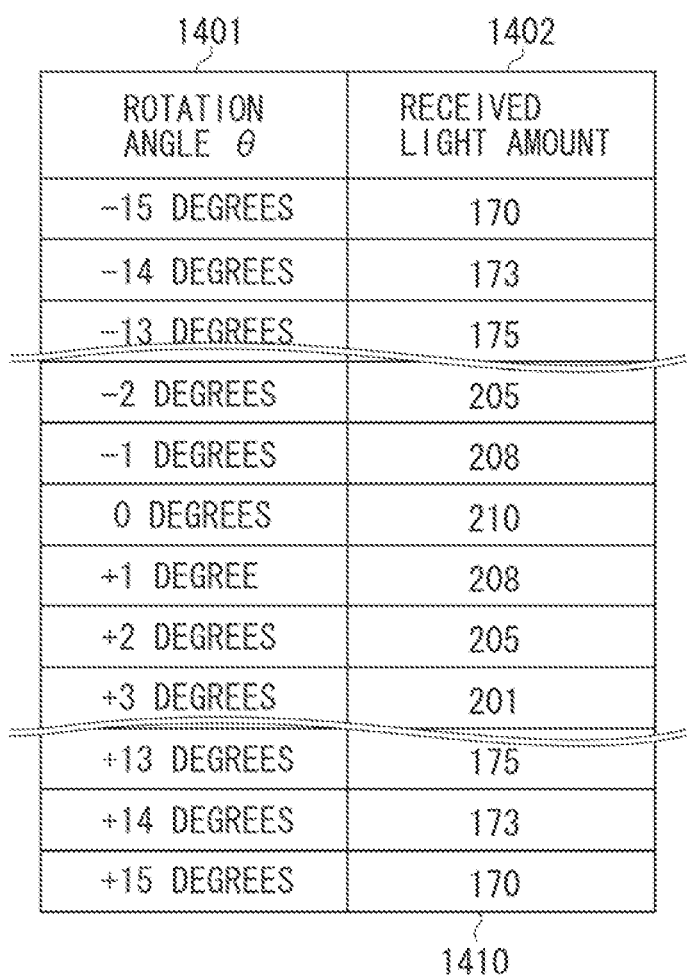

In step S1101, the CPU 801 transmits a control signal to the ASIC 802 to cause the ASIC 802 to control the two-sided driving motor 840, rotating the image reading unit 100 in the counterclockwise direction by 15 degrees from the current home position (FIG. 12C). In step S1102, the CPU 801 controls and causes the light emitting element 907 to emit light. In step S1103, the CPU 801 reads all data values for a main-scanning density (10368 pixels) of the sensor 901 in the image reading unit 100 with the light emitting element 907 emitting light. FIG. 12G illustrates the CIS 901 and the light emitting element 907 inside the image reading unit 100 in FIG. 12F. The main-scanning density for the CIS 901 lies from a sensor number 0 (1301 in FIG. 12G) to a sensor number 10367 (1302 in FIG. 12G). In the present exemplary embodiment, the number of main-scanning pixels is 10368. However, the number of main-scanning pixels is not limited to 10368. In step S1104, the CPU 801 performs average processing using the received light amount for 1 line (L(i): i=0 to 10367) received in step S1103 and stores the received rotation angle and the average value of the received light amount in the image memory 804. FIG. 14A is a chart of the rotation angle θ versus the received light amount.

$$\text{Received light amount} = \left(\sum_{i=0}^{10367} L_{(i)}\right) / 10368 \quad (1)$$

The received light amount refers to luminance, and L in the L*a*b space or Y in the YUV system may be used or another unit indicating luminance may be used.

In step S1105, the CPU 801 transmits the control signal to the ASIC 802 to cause the ASIC 802 to control the two-sided driving motor 840, rotating the image reading unit 100 in the clockwise direction only by one degree. In step S1106, the CPU 801 determines whether the rotation angle θ of the image reading unit 100 is equal to or greater than +16 degrees in the clockwise direction. The processing of steps S1102 to S1105 is repeated until the rotation angle θ of the image reading unit 100 becomes +15 degrees from −15 degrees. If the CPU 801 determines that the rotation angle θ is equal to or greater than +16 degrees (YES in step S1106), the processing proceeds to step S1107. In step S1107, the CPU 801 extracts the rotation angle at which the received light amount is maximum in the rotation angles θ of −15 degrees to +15 degrees, from data groups stored in the image memory 804. FIG. 14B illustrates a received light amount (luminance information) versus each rotation angle obtained in steps S1101 to S1106. In FIG. 14B, the maximum received-light amount is 210 (refer to 1403 in FIG. 14B). The rotation angle of the image reading unit 100 at which the received light amount becomes maximum is −2 degrees (refer to 1404 in FIG. 14B). This means that the current position of the image reading unit 100 deviates by 2 degrees in the clockwise direction as illustrated in FIG. 12C.

In step S1108, the CPU 801 transmits the control signal to the ASIC 802 to cause the ASIC 802 to control the two-sided driving motor 840, rotating the image reading unit 100 in the counterclockwise direction only by 2 degrees. The direction in which the image reading unit 100 is rotated is the one in which the image reading unit 100 becomes close to the white reference member 101. The position acquired after the rotation is set again as a new home position. The above is a flow of the program for correcting the home position (the reference position) of the image reading unit 100.

The shading correction program for the sensor 901 in the image reading unit 100 executed in step S1004 in FIG. 10 is described in detail below with reference to the flow chart in FIG. 15 and FIGS. 16 to 22.

In step S1501, the CPU 801 determines whether to generate the shading correction coefficient for reading the front surface, which is the first surface of the document, or for reading the rear surface, which is the second surface of the document. As illustrated in FIG. 3, the image reading unit 100 is in a position where it faces the white reference member 101 before the image reading unit 100 is rotated to be in a position where it faces the two-sided conveyance path 80 and starts to read the first surface of the document. The light emitting element 907 emits light and the CIS 901 receives the light reflected by the white reference member 101 to generate the shading correction coefficient for reading the front surface, which is the first surface of the document. The position where the image reading unit 100 faces the white reference member 101 is the one that is illustrated in FIG. 2. As illustrated in FIG. 5, the image reading unit 100 is in a position where it faces the white reference member 101 before the image reading unit 100 is rotated to be in a position where it faces the document conveyance path 81 and starts to read the second surface of the document. The light emitting element 907 emits light and the CIS 901 receives the light reflected by the white reference member 101 to generate the shading correction coefficient for reading the rear surface, which is the second surface of the document. If the CPU 801 determines the generation of the shading correction coefficient for reading the front surface (YES in step S1501), the processing proceeds to step S1502. If the CPU 801 determines the generation of the shading correction coefficient for reading the rear surface (NO in step S1501), the processing proceeds to step S1503.

In step S1502, the CPU 801 sets −5 degrees to a parameter StartDeg of an initial rotation angle of the image reading unit 100 and sets +25 degrees to a parameter StopDeg of a measurement-stop rotation angle of the image reading unit 100. If the image reading unit 100 tilts in the clockwise direction (in a state of FIG. 12C) from an idealistic state where the image reading unit 100 does not tilt (refer to FIG. 12B), a rotation angle θ becomes plus (+), and if the image reading unit 100 tilts in the counterclockwise direction (in a state of FIG. 12A), a rotation angle θ becomes minus (−). The reason the rotation angle θ of the image reading unit 100 is set to −5 degrees to +25 degrees to calculate the shading correction coefficient for reading the first surface (the front surface) is described below. As illustrated in FIG. 3, the image reading unit 100 is rotated to be in a position where it faces the two-sided conveyance path 80 (the first conveyance path) and starts to read the first surface of the document. In applying the shading correction to the data read from the first surface of the document, it is idealistic to provide the white reference member 101 near the position where the image reading unit 100 faces the two-sided conveyance path 80. This is because the calculation of the shading coefficient in the environment different from temperature and humidity in the position where the image reading unit 100 reads the document degrades the accuracy of the shading correction. For example, the light receiving sensitivity of the CIS 901 changes depending on temperatures in a reception environment to change the dynamic range of light received by the sensor. More specifically, when the CIS 901 receives light, as the temperature rises, the voltage in a dark portion rises to increase a black reference correction value, narrowing the dynamic range. For this reason, the shading coefficient needs to be calculated at the same temperature as that in the position where the image reading unit 100 reads the document. In the image processing apparatus 1 according to the present exemplary embodiment, the temperature in the position where the image reading unit 100 faces the two-sided conveyance path 80 is higher than the temperature in the document conveyance path 81 because the heating roller 51 of the fixing unit 50 lies in the vicinity of the two-sided conveyance path 80. Therefore, only the portion of the white reference member 101 nearer to the two-sided conveyance path 80 than any other portion of the white reference member 101 is irradiated with light to read the white reference member 101 at the same temperature as that in the position where the image reading unit 100 faces the two-sided conveyance path 80.

Figure 12E:
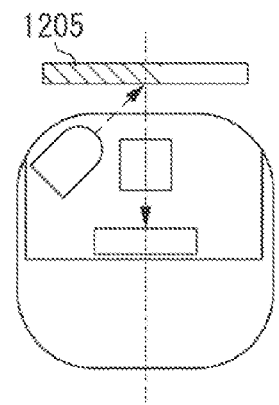

In step S1503, the CPU 801 sets −25 degrees to the parameter StartDeg of the initial rotation angle of the image reading unit 100 and sets +5 degrees to the parameter StopDeg of the measurement-stop rotation angle of the image reading unit 100. The reason the rotation angle θ of the image reading unit 100 is set to −25 degrees to +5 degrees to calculate the shading correction coefficient for reading the second surface (the rear surface) is described below. As illustrated in FIG. 5, the image reading unit 100 is rotated to be in a position where it faces the document conveyance path 81 (the second conveyance path) and starts to read the second surface of the document. Because the calculation of the shading coefficient in the environment different from temperature and humidity in the position where the image reading unit 100 reads the document degrades the accuracy of the shading correction, the portion of the white reference member 101 nearer to the document conveyance path 81 than any other portion of the white reference member 101 is irradiated with light by the light emitting element 907. For example, as illustrated in FIG. 12E, only the left position (1205) of the white reference member 101 has only to be irradiated with light to calculate the shading correction coefficient for reading the second surface (the rear surface) of the document.

In step S1504, the CPU 801 transmits the control signal to the ASIC 802 to cause the ASIC 802 to control the two-sided driving motor 840, rotating the image reading unit 100 to the rotation angle θ set to the StartDeg from the current home position. In step S1505, the CPU 801 stops the light emitting element 907 from emitting light if the light emitting element 907 of the image reading unit 100 is instructed to emit light. In step S1506, the CPU 801 stores the luminance information acquired by the image reading unit 100 reading the white reference member 101 with the light emitting element 907 not emitting light in a black reference data storage area of the image memory 804 as black reference data for correcting shading. The black reference data are stored in the memory 804 along with the rotation angle of the image reading unit 100 in reading. FIG. 17B illustrates the black reference data group acquired in step S1506 in calculating the shading correction coefficient for reading the first surface (the front surface) of the document. FIG. 17A illustrates the black reference data group acquired in step S1506 in calculating the shading correction coefficient for reading the second surface (the rear surface) of the document. FIGS. 17A and 17B illustrate luminance values acquired by each pixel of the sensor 901 reading the white reference member 101 with respect to each rotation angle θ of the image reading unit 100.

Figure 18A:
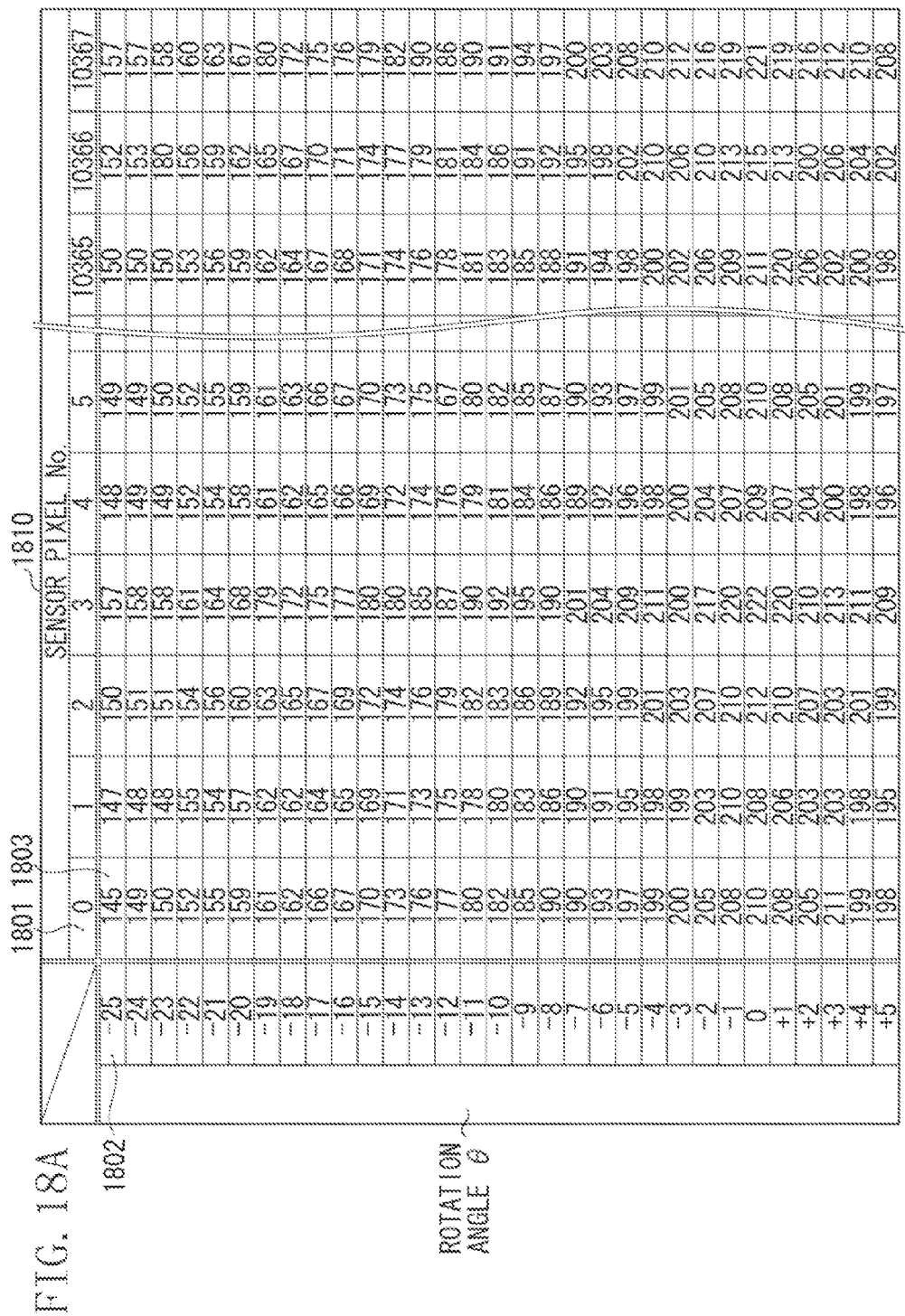
FIGS. 18A and 18B illustrate white reference data groups received by the CIS according to the first exemplary embodiment.
Figure 18B:
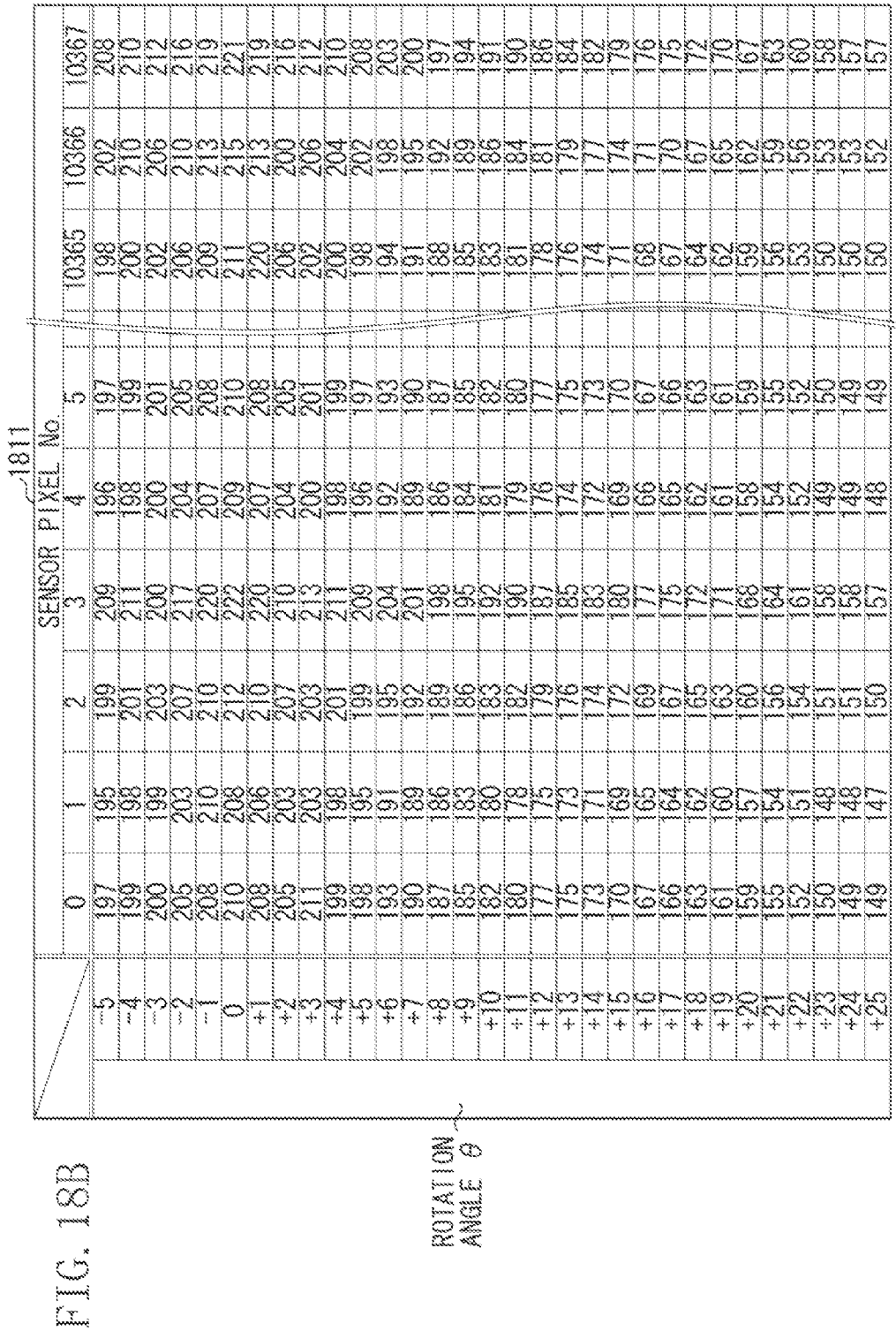

In step S1507, the CPU 801 instructs the light emitting element 907 of the image reading unit 100 to emit light. In step S1508, the CPU 801 stores the luminance information acquired by the image reading unit 100 reading the white reference member 101 with the light emitting element 907 emitting light in a white reference data storage area of the image memory 804 as white reference data for correcting shading. The white reference data are stored in the memory 804 along with the rotation angle of the image reading unit 100 in reading. FIG. 18B illustrates the white reference data group acquired in step S1508 in calculating the shading correction coefficient for reading the first surface (the front surface) of the document. FIG. 18A illustrates the white reference data group acquired in step S1508 in calculating the shading correction coefficient for reading the second surface (the rear surface) of the document. FIGS. 18A and 18B illustrate luminance values acquired by each pixel of the sensor 901 reading the white reference member 101 with respect to each rotation angle θ of the image reading unit 100.

In step S1509, the CPU 801 transmits the control signal to the ASIC 802 to cause the ASIC 802 to control the two-sided driving motor 840, rotating the image reading unit 100 in the clockwise direction by +1 degree from the current position. In step S1509, the image reading unit 100 is rotated in steps of 1 degree. However, it may be rotated in steps of 2, 4, or other degrees, provided that they are predetermined units of angles. In step S1510, the CPU 801 determines whether the rotation angle of the image reading unit 100 reaches the StopDeg of the measurement stop rotation angle. If the rotation angle does not reach the StopDeg (NO in step S1510), the processing returns to Step S1505. If it is determined that the rotation angle of the image reading unit 100 reaches the StopDeg of the measurement stop rotation angle (YES in step S1510), the processing proceeds to Step S1511.

Figure 19A:
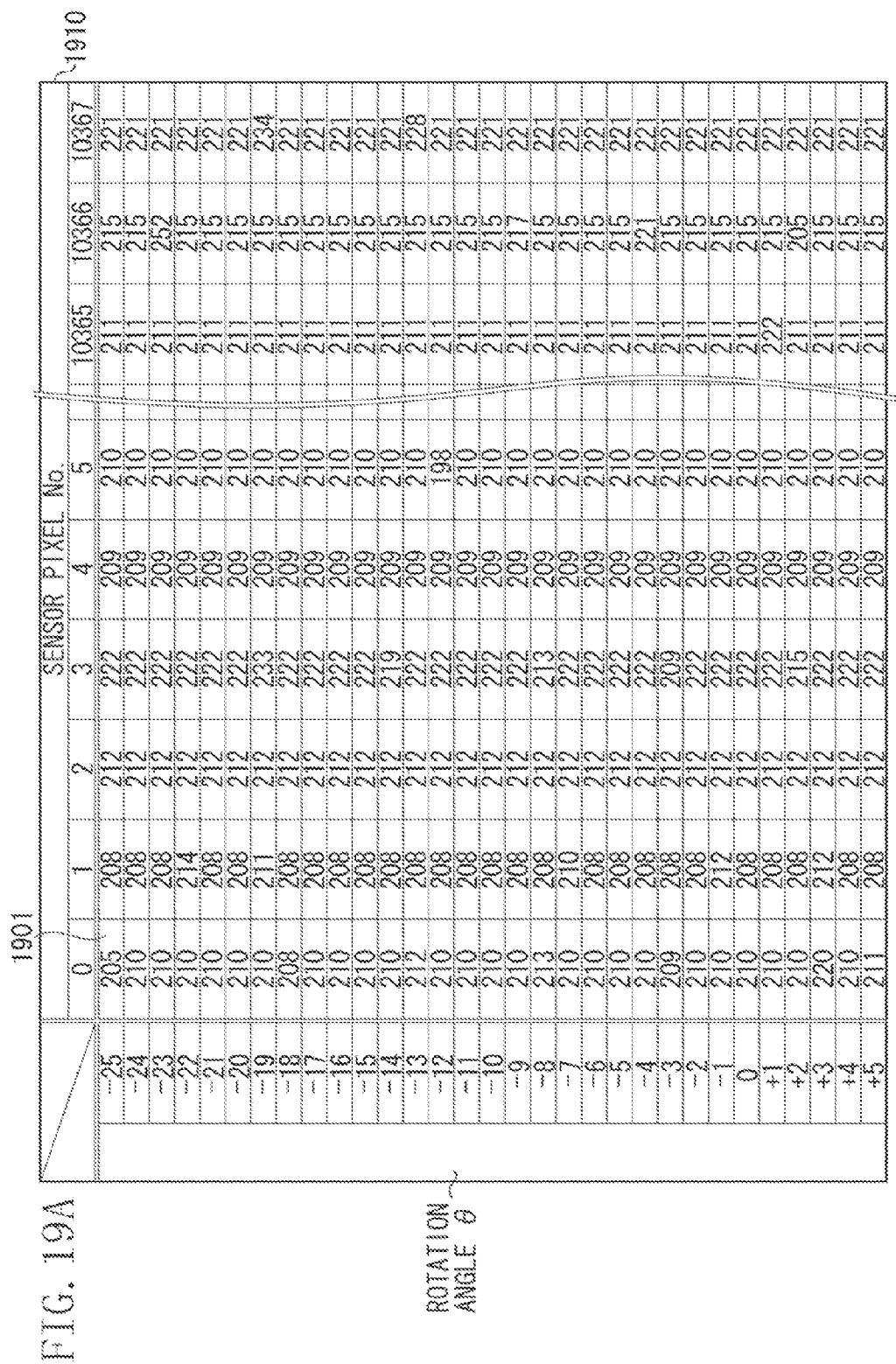

In Step S1511, the CPU 801 multiplies the white reference data group (FIGS. 18A and 18B) acquired in step S1508 by the correction coefficient determined for each rotation angle to correct the white reference data group. FIG. 19A can be acquired by correcting the white reference data group in FIG. 18A. FIG. 19B can be acquired by correcting the white reference data group in FIG. 18B. FIG. 16 illustrates a relationship of a correction coefficient to each rotation angle. The reason why the larger the rotation angle θ (or the smaller the rotation angle θ), the greater the correction coefficient in FIG. 16 is described below. This is because the distance over which the light emitted from the light emitting element 907 is reflected by the white reference member 101 and reaches the sensor 901 is increased accordingly as the rotation angle θ of the image reading unit 100 is away from 0 degrees, which decreases the quantity of the reflected light with respect to light emitted by the light emitting element 907. More specifically, if the rotation angle θ of the image reading unit 100 is −25 degrees, information (1803 in FIG. 18A) read by the sensor No. 0 is multiplied by a correction coefficient of 1.411 at a rotation angle of −25 degrees indicated in FIG. 16. The information read by the sensor No. 0 is 145, so that 145× 1.411=205. Multiplication of the information read by the sensor by the correction coefficient is performed for all the angles and the sensor pixels to generate the corrected white reference data groups illustrated in FIGS. 19A and 19B. The generated white reference data groups are stored in the image memory 804. In step S1511, the white reference data acquired in step S1508 is multiplied by the correction coefficient for each rotation angle indicated in FIG. 16. However, the black reference data acquired in step S1506 may be multiplied by the correction coefficient for each rotation angle indicated in FIG. 16.

In Step S1512, the CPU 801 generates final white reference correction values (FIGS. 20C and 20D) and black reference correction values (FIGS. 20A and 20B) for the CIS 901 based on the white reference data groups (FIGS. 19A and 19B) corrected in step S1511 and stored in the image memory 804 and the black reference data groups (FIGS. 17A and 17B) acquired in step S1506. The average value of luminance values from the rotation angles of −25 degrees to +5 degrees is calculated for each sensor pixel of the white reference data groups (FIG. 19A) stored in the image memory 804 to calculate the white reference correction values for each sensor pixel in reading the second surface (the rear surface). FIG. 20C illustrates the white reference correction values for each sensor pixel in reading the second surface. The average value of information values from the rotation angles of −5 degrees to +25 degrees is calculated for each sensor pixel of the white reference data groups (FIG. 19B) stored in the image memory 804 to calculate the white reference correction values for each sensor pixel in reading the first surface (the front surface). FIG. 20D illustrates the white reference correction values for each sensor pixel in reading the first surface. The average value of information values from the rotation angles of −25 degrees to +5 degrees is calculated for each sensor pixel of the black reference data groups (FIG. 17A) stored in the image memory 804 to calculate the black reference correction values for each sensor pixel in reading the second surface (the rear surface). FIG. 20A illustrates the black reference correction values for each sensor pixel in reading the second surface. The average value of information values from the rotation angles of −5 degrees to +25 degrees is calculated for each sensor pixel of the black reference data groups (FIG. 17B) stored in the image memory 804 to calculate the black reference correction values for each sensor pixel in reading the first surface (the front surface). FIG. 20B illustrates the black reference correction values for each sensor pixel in reading the first surface.

If the luminance values stored in the image memory 804 include values outside a predetermined range, the luminance values outside the predetermined range do not have to be used for averaging in step S1511. This is because the acquired luminance values are inadequate for generating the white reference correction value if dust sticks to the white reference member 101 or a part of the white reference member 101 deteriorates due to aging in acquiring data of the white reference data groups.

The following describes how to perform the shading correction of the luminance information of the read document using the white reference correction values (FIGS. 20C and 20D) and the black reference correction values (FIGS. 20A and 20B) generated in step S1512.

A signal level $\text{Vout}_{(i)}$ acquired after the shading correction is calculated based on the following equation (2). A luminance level $\text{Vin}_{(i)}$ (i=0 to 10367) is the luminance level of the document read by the image reading unit 100. As illustrated in FIG. 3, when the image reading unit 100 is rotated to the position where the image reading unit 100 faces the two-sided conveyance path 80 to read the first surface of the document, the black and white reference correction values for reading the first surface of the document illustrated in FIGS. 20B and 20D are used. As illustrated in FIG. 5, when the image reading unit 100 is rotated to the position where the image reading unit 100 faces the document conveyance path 81 to read the second surface of the document, the black and white reference correction values for reading the second surface of the document illustrated in FIGS. 20A and 20C are used.

$$\text{Vout}_{(i)} = \{\text{Vin}_{(i)} - \text{black reference correction value}_{(i)}\} \times \{255/(\text{white reference correction value}_{(i)} - \text{black reference correction value}_{(i)})\} \quad (2)$$

A signal level after the shading correction is performed is calculated by multiplying a value obtained by subtracting the black reference correction value of a corresponding sensor from the signal level for each sensor read from the image reading unit 100 by a value obtained by dividing 255 by a value obtained by subtracting the black reference correction value from the white reference correction value. In equation (2), a value by which the $\text{Vin}_{(i)}$ is multiplied is the shading correction coefficient. In other words, the shading correction coefficient is $\{255/(\text{white reference correction value}_{(i)} - \text{black reference correction value}_{(i)})\}$. The first shading correction coefficient is calculated from the black and white reference correction values for reading the first surface of the document illustrated in FIGS. 20B and 20D. The second shading correction coefficient is calculated from the black and white reference correction values for reading the second surface of the document illustrated in FIGS. 20A and 20C.

In the shading correction for the second surface (the rear surface), if the sensor pixel No. 0 (1301 in FIG. 12G) performs the shading correction, the white reference correction value of the sensor is 210 (2112 in FIG. 20C) and the black reference correction value of the sensor is 10 (2012 in FIG. 20A). A replacement equation for the shading correction is represented by equation (3).

$$\text{Vout}_{(0)} = \{\text{Vin}_{(0)} - 10\} \times \{255/(210 - 10)\} \quad (3)$$

FIG. 22 is a graph which represents equation (3) and provides the value $\text{Vout}_{(0)}$ normalized at 0 to 255 as a function of the input $\text{Vin}_{(0)}$. Similarly, in the shading correction for the first surface (the front surface), if the sensor pixel No. 10367 (1302 in FIG. 12G) performs the shading correction, the white reference correction value of the sensor is 221 (2113 in FIG. 20D) and the black reference correction value of the sensor is 10 (2013 in FIG. 20B). A replacement equation for the shading correction is represented by equation (4).

$$\text{Vout}_{(0)} = \{\text{Vin}_{(0)} - 10\} \times \{255/(221 - 10)\} \quad (4)$$

In the first exemplary embodiment, a white reference correction value is corrected using a correction coefficient predetermined for each rotation angle of the image reading unit 100, and the shading correction is performed using the corrected white correction value to allow a high accurate white reference correction value to be calculated even if the image reading unit 100 is rotated to read the white reference member.

In the description of the first exemplary embodiment, the program for correcting the home position and the program for correcting the shading data are executed using the CPU 801 and the image memory 804 of the image processing apparatus 1, but the programs may be executed by a control controller connected to the image processing apparatus 1.

In a second exemplary embodiment, there is described below another method for detecting the deviation of the image reading unit 100 from its home position in step S1002 in the first exemplary embodiment.

Figure 11:
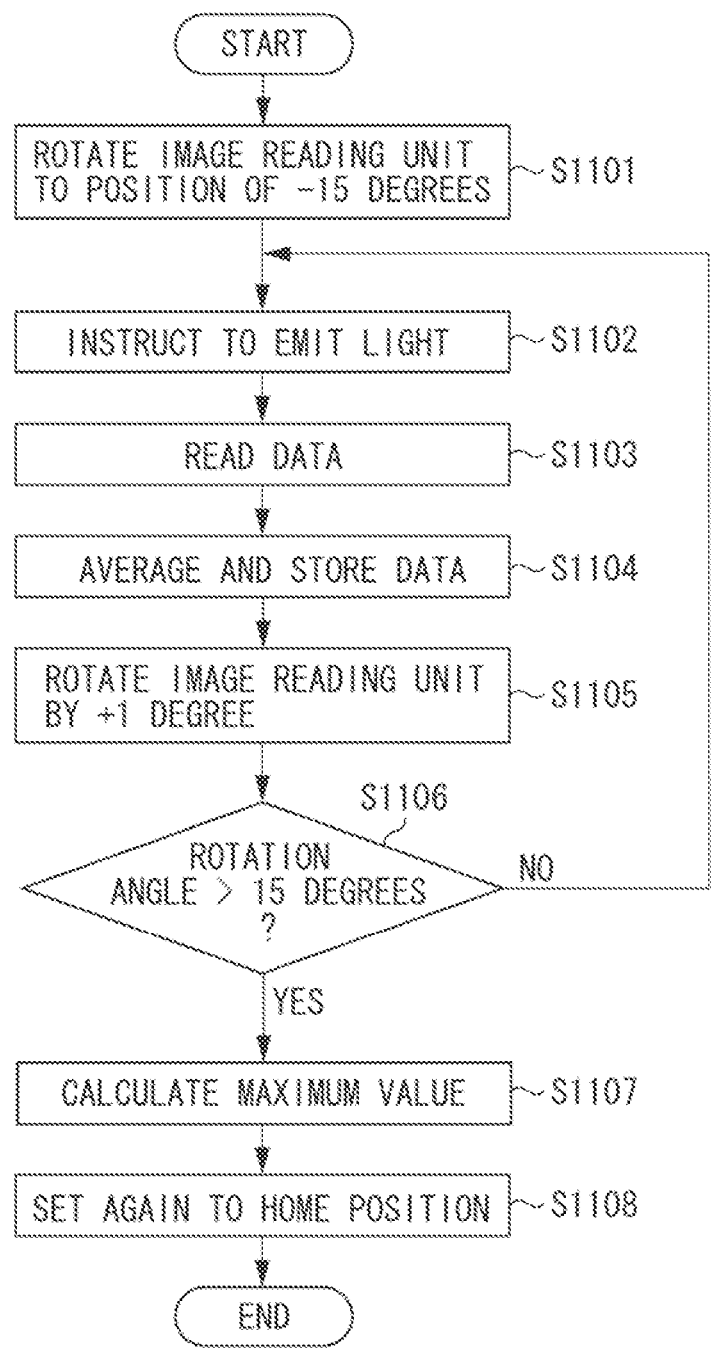
FIG. 11 is a flow chart of a program for correcting the home position of the image reading unit according to a first exemplary embodiment.

In the first exemplary embodiment, the received light amount for one line (L(i): i=0 to 10367) is subjected to the average processing using equation (1) in step S1104 in FIG. 11. In the second exemplary embodiment, one line is evenly divided into three portions, average values are calculated in the divided portions, and each of the average values is stored in the image memory 804. FIG. 23A illustrates average values of the received light amount from i=0-th to 3455-th pixels. FIG. 23B illustrates average values of the received light amount from i=3456-th to 6911-th pixels. FIG. 23C illustrates average values of the received light amount from i=6912-th to 10367-th pixels. The received light amount versus the rotation angle θ illustrated in FIGS. 23A, 23B, and 23C is stored in the image memory 804. If the home position of the image reading unit 100 is in the position in FIG. 12B, the maximum values in the data groups of the divided received-light-amount are acquired at the same angle in any of the divided portions. However, in FIGS. 23A, 23B, and 23C, the maximum values are acquired at entirely different angles of +2 degrees, 0 degrees, and −2 degrees respectively, In such a case of the data groups in FIGS. 23A, 23B, and 23C, it is determined that the home position of the image reading unit 100 is slant. If the home position of the image reading unit 100 is slant, the CPU 801 notifies the user that the home position of the image reading unit 100 is slant via the operation unit 805 of the image processing apparatus 1.

In a third exemplary embodiment, there is described below another method for correcting the home position of the image reading unit 100 in step S1002 in FIG. 10 in the first exemplary embodiment. In the third exemplary embodiment, the home position is corrected using the edge of the white reference member 101. FIG. 24 is a flow chart for the correction processing of the home position executed by the image processing apparatus 1. In the present exemplary embodiment, the CPU 801 executes the control program based on the flow chart to execute the following correction processing.

The processing in steps S2402 to S2405 in FIG. 24 is similar to the processing in steps S1102 to S1105 in FIG. 11 in the first exemplary embodiment, so that the description thereof is omitted. The processing in step S2401 in FIG. 24 is different from the processing in step S1101 in FIG. 11 only in rotation angle. In step S1101, the image reading unit 100 is rotated to −15 degrees. In step S2401, the image reading unit 100 is rotated to −50 degrees. The control for rotation is similar to that in step S1101 in FIG. 11.

The processing in step S2406 is described below. In step S2406, if it is determined that the rotation angle θ is greater than 50 degrees, the processing proceeds to step S2407. If it is determined that the rotation angle θ is equal to or smaller than 50 degrees, the processing returns to step S2402.

In step S2407, the CPU 801 refers to the received light amount (luminance information) at each rotation angle stored in the image memory 804 to detect the angle that produces a difference exceeding a prescribed amount in the received light amount between rotation angles. In other words, in step 2407, the angle is determined at which the amount of change in the luminance information between adjacent rotation angles exceeds the prescribed value. FIG. 13 illustrates the received light amount versus each rotation angle θ. FIG. 13 illustrates the received light amount of 10 (2501 in FIG. 13) and 114 (2502 in FIG. 13) at −48 and −47 degrees, respectively, and the received light amount of 120 (2503 in FIG. 13) and 10 (2504 in FIG. 13) at +43 and +44 degrees, respectively. The CPU 801 determines that the angle of the left end of the white reference member 101 is −48 degrees and the angle of the right end thereof is +44 degrees.

Since an intermediate point between angles at the left and right ends of the white reference member 101 is the current home position, in step S2408, the CPU 801 determines the value obtained by dividing the sum of the left and right ends of the white reference member 101 by two as the angle (a tilt angle) of the current home position of the image reading unit 100. For example, in FIG. 13, the CPU 801 determines the position of {+44 degrees+(−48 degrees)}/2=−2 degrees as the current home position. The CPU 801 transmits the control signal to the ASIC 802 to cause the ASIC 802 to control the two-sided driving motor 840, rotating the image reading unit 100 in the clockwise direction by 2 degrees from the current home position to correct the tilt angle of the image reading unit 100 to 0 degrees. The CPU 801 resets the position acquired after the image reading unit 100 is rotated as a new home position.

Thus, the image reading unit 100 is rotated to detect the angle at which a difference in the received light amount from the white reference member 101 exceeds the prescribed value, allowing the easy detection of the deviation of the image reading unit 100 from its home position.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-134837 filed Jun. 14, 2012, which is hereby incorporated by reference herein in its entirety.

What is claimed is:
1. An image processing apparatus comprising:
an acquisition unit configured to acquire luminance information of a white reference member by reading the white reference member with an image reading unit including a sensor while rotating the image reading unit in units of a predetermined angle; and
a correction unit configured to correct the luminance information acquired by the acquisition unit using a correction coefficient predetermined for each rotation angle of the image reading unit.

2. The image processing apparatus according to claim 1, wherein a position where the white reference member is read is different from a position where a document is read.

3. The image processing apparatus according to claim 2, wherein the position where the white reference member is read is in a rotary orbit of the image reading unit and between a position where a first surface of the document is read and a position where a second surface of the document is read.

4. The image processing apparatus according to claim 2, wherein the acquisition unit acquires the luminance information by rotating the image reading unit over a first angular range to calculate a first shading correction coefficient used for shading correction performed in reading a first surface of the document and acquires the luminance information by rotating the image reading unit over a second angular range to calculate a second shading correction coefficient used for shading correction performed in reading a second surface of the document.

5. The image processing apparatus according to claim 4, wherein the acquisition unit acquires the luminance information of a member near a first conveyance path in the white reference member by rotating the image reading unit over the first angular range and acquires the luminance information of a member near a second conveyance path in the white reference member by rotating the image reading unit over the second angular range.

6. The image processing apparatus according to claim 5, wherein the first conveyance path is a conveyance path along which the document is conveyed when the first surface of the document is read, and the second conveyance path is a conveyance path along which the document is conveyed when the second surface of the document is read.

7. The image processing apparatus according to claim 1, further comprising a shading correction unit configured to perform shading correction on data read by the image reading unit using the luminance information corrected by the correction unit.

8. An image processing method comprising:
   acquiring luminance information of a white reference member by reading the white reference member with an image reading unit including a sensor while rotating the image reading unit in units of a predetermined angle; and
   correcting the luminance information using a correction coefficient predetermined for each rotation angle of the image reading unit.

9. A computer-readable storage medium storing a program that causes a computer to execute the image processing method according to claim 8.

* * * * *